US009696799B2

(12) United States Patent
Tanaka

(10) Patent No.: US 9,696,799 B2
(45) Date of Patent: Jul. 4, 2017

(54) INFORMATION DISPLAY DEVICE THAT DISPLAYS INFORMATION ON A SCREEN

(71) Applicant: Kohei Tanaka, Chiyoda-ku (JP)

(72) Inventor: Kohei Tanaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 522 days.

(21) Appl. No.: 14/352,497

(22) PCT Filed: Sep. 28, 2012

(86) PCT No.: PCT/JP2012/075167
§ 371 (c)(1),
(2) Date: Apr. 17, 2014

(87) PCT Pub. No.: WO2013/111388
PCT Pub. Date: Aug. 1, 2013

(65) Prior Publication Data
US 2014/0250395 A1 Sep. 4, 2014

(30) Foreign Application Priority Data

Jan. 23, 2012 (JP) ................................. 2012-011181

(51) Int. Cl.
*G06F 3/00* (2006.01)
*G06F 3/01* (2006.01)
(Continued)

(52) U.S. Cl.
CPC .............. *G06F 3/013* (2013.01); *B60K 35/00* (2013.01); *G06F 3/0482* (2013.01);
(Continued)

(58) Field of Classification Search
None
See application file for complete search history.

(56) References Cited

U.S. PATENT DOCUMENTS 5,764,139 A 6/1998 Nojima et al.
5,850,211 A 12/1998 Tognazzini
(Continued)

FOREIGN PATENT DOCUMENTS

JP 9 123848 5/1997
JP 10-124035 A 5/1998
(Continued)

OTHER PUBLICATIONS

Office Action issued Mar. 17, 2015 in Japanese Patent Application No. 2013-555119 (with partial English language translation).
(Continued)

*Primary Examiner* — Toan Vu
(74) *Attorney, Agent, or Firm* — Oblon, McClelland, Maier & Neustadt, L.L.P.

(57) ABSTRACT

An information display device that displays plural pieces of display information on a screen while laying out these pieces of display information, including: a gaze judger that judges whether or not the user is gazing at the screen; a display area change detector that detects a change of the display area of the display information; a display area determinator that, when a change of the display area is detected when the user is gazing at the screen, determines a display area according to a ratio of the change of the display area; and a display information display that displays the display information according to the display area of the display information. Even when the layout of the display information is changed in a state in which the user is not gazing at the screen, a change from a state in which an original display is produced is displayed when the user is gazing at the screen.

12 Claims, 24 Drawing Sheets

(51) Int. Cl.
*G06F 3/0482* (2013.01)
*G06F 3/0481* (2013.01)
*B60K 35/00* (2006.01)
*G06F 3/0484* (2013.01)

(52) U.S. Cl.
CPC ........ *G06F 3/0484* (2013.01); *G06F 3/04817* (2013.01); *B60K 2350/1096* (2013.01); *B60K 2350/2013* (2013.01); *B60K 2350/2052* (2013.01); *B60K 2350/405* (2013.01); *B60K 2350/922* (2013.01); *G06F 2203/04803* (2013.01)

(56) References Cited

U.S. PATENT DOCUMENTS

| | | | | |
|---|---|---|---|---|
| 6,577,329 | B1* | 6/2003 | Flickner | G06Q 30/02 715/774 |
| 8,913,004 | B1* | 12/2014 | Bozarth | G06K 9/00604 345/156 |
| 2003/0137515 | A1* | 7/2003 | Cederwall | G06T 13/40 345/473 |
| 2008/0309475 | A1 | 12/2008 | Kuno et al. | |
| 2009/0089091 | A1* | 4/2009 | Sawasaki | G06F 19/321 705/2 |
| 2009/0146775 | A1* | 6/2009 | Bonnaud | G06F 9/4446 340/3.1 |
| 2009/0315740 | A1* | 12/2009 | Hildreth | G06F 3/017 341/20 |
| 2011/0254865 | A1 | 10/2011 | Yee et al. | |
| 2011/0302538 | A1* | 12/2011 | Vennelakanti | G06F 3/038 715/863 |
| 2012/0272179 | A1* | 10/2012 | Stafford | G06F 3/012 715/781 |
| 2012/0278766 | A1* | 11/2012 | Massengill | A61B 3/113 715/846 |
| 2013/0145304 | A1* | 6/2013 | DeLuca | G06F 3/013 715/781 |
| 2014/0049452 | A1* | 2/2014 | Maltz | G06F 3/013 345/8 |
| 2015/0149961 | A1* | 5/2015 | Karakotsios | G06F 3/017 715/810 |
| 2015/0309570 | A1* | 10/2015 | Lankford | G06F 3/013 715/863 |

FOREIGN PATENT DOCUMENTS

| | | |
|---|---|---|
| JP | 11-85452 A | 3/1999 |
| JP | 11 311545 | 11/1999 |
| JP | 2001 175992 | 6/2001 |
| JP | 2002 362186 | 12/2002 |
| JP | 2003 169317 | 6/2003 |
| JP | 2007 153116 | 6/2007 |
| JP | 2009 73431 | 4/2009 |

OTHER PUBLICATIONS

International Search Report Issued Nov. 13, 2012 in PCT/JP12/075167 Filed Sep. 28, 2012.
Combined Chinese Office Action and Search Report issued Jan. 7, 2016 in Patent Application No. 201280058994.1 (with partial English language translation and English translation of categories of cited documents).

* cited by examiner

FIG.4

| | Variable | Operation Example a | Operation Example b | Operation Example c |
|---|---|---|---|---|
| 51 | Gaze Flag | OFF | ON | ON |
| 52 | Gaze Accumulated Time | 0[frame] | 46[frame] | 1[frame] |
| 53 | Previous Layout Information | — | Display Layout Information About "Stationary State" | Display Layout Information About "Stationary State" |
| 54 | Current Layout Information | Display Layout Information About "Stationary State" | Display Layout Information About "Stationary State" | Display Layout Information About "Normal Traveling State" |
| 55 | Animation Counter | 0[frame] | 15[frame] | 1[frame] |
| 56 | Animation Frame Length | 15[frame] | 15[frame] | 15[frame] |
| 57 | Animation Progress Ratio | 0[%] | 100[%] | 6.7[%] |
| 58 | Animation Display Time Period | 45[frame] | 45[frame] | 45[frame] |

FIG.12
(a)
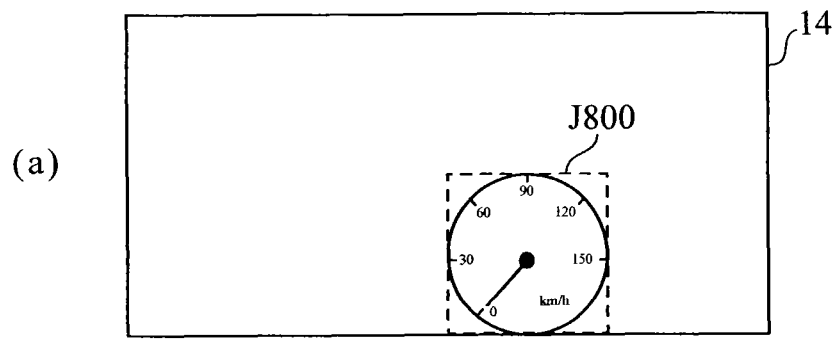
"Speed Meter" In Previous Layout Information
(b)
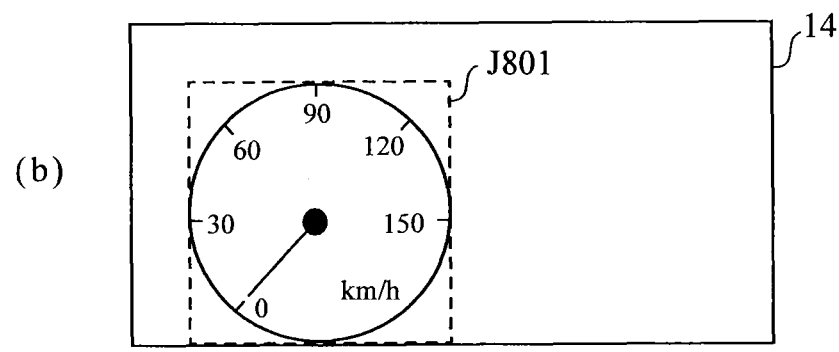
"Speed Meter" In Current Layout Information
(c)
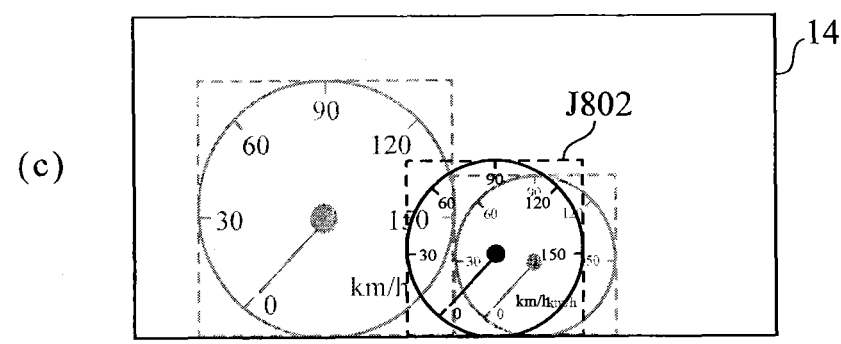
"Speed Meter" Drawn In Determined Area

FIG.13
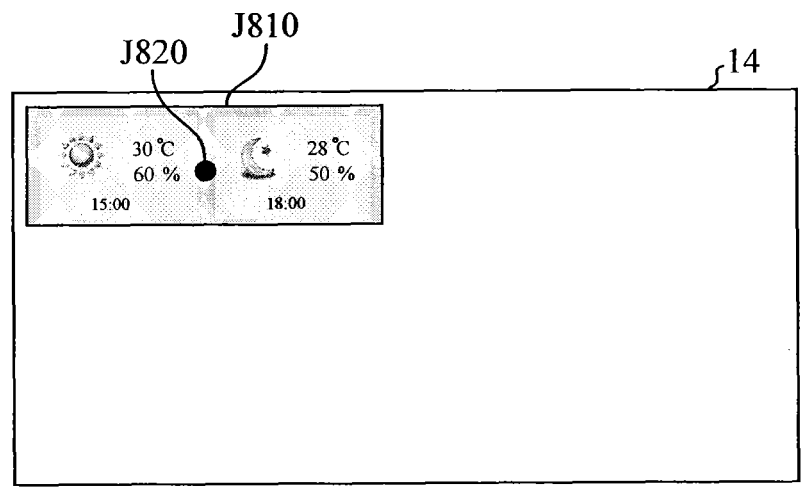
(a)
"Weather Information" In Previous Layout Information
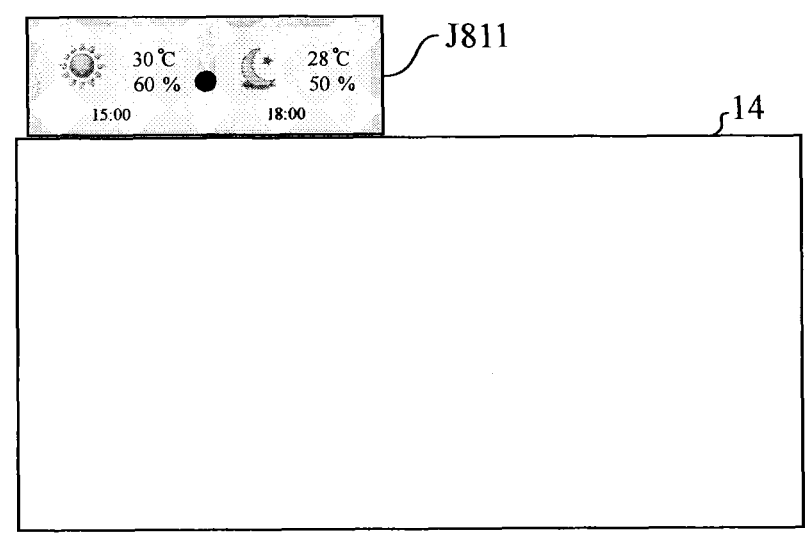
(b)
Display Area Where Display Disappears

FIG.17
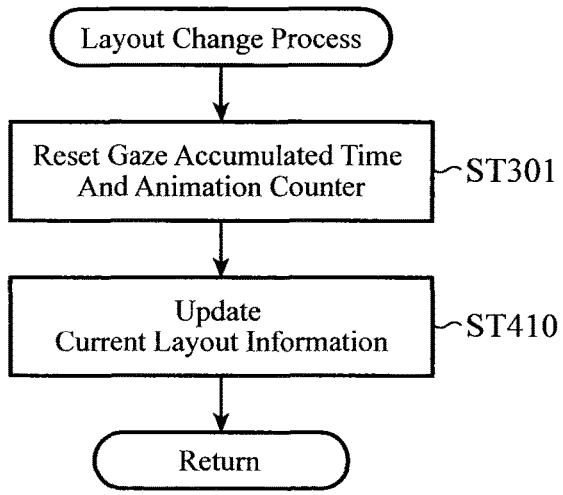
FIG.18
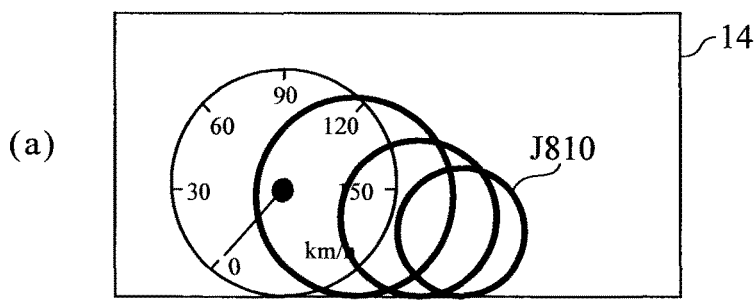
Display Showing Movement Using Frames
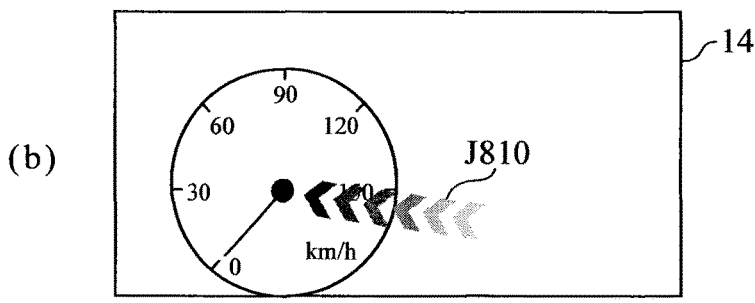
Display Showing Movement Using Arrows

| Display Contents | Priority |
|---|---|
| Speed Meter | 99 |
| Vehicle Information | 98 |
| Fuel Gauge | 97 |
| Clock | 90 |
| Route Guidance | 80 |
| Tachometer | 70 |
| Congestion-On-Route Information | 50 |
| Audio Information | 30 |
| Destination Weather Information | 10 |

| Driving Condition | Graze Enable Time Period |
|---|---|
| At Rest | 1000ms |
| Under Normal Driving | 100ms |
| Under Driving In Dark | 70ms |
| ⋮ | ⋮ |

Display Area At Time Of 50%

| 47 |
| --- |
| Display Contents Permitted |
| Speed Meter |
| Tachometer |
| Fuel Gauge |
| Route Guidance |

INFORMATION DISPLAY DEVICE THAT DISPLAYS INFORMATION ON A SCREEN

FIELD OF THE INVENTION

The present invention relates to an information display device that lays out and displays a large number of pieces of information of different types on a screen thereof.

BACKGROUND OF THE INVENTION

Conventionally, a problem with an information display device that lays out and displays a plurality of pieces of information of different types on a screen is that information which the user requires, timing with which the user requires the information, and a layout legible for the user or the user's favorite layout differ variously according to the user. On the other hand, for example, patent reference 1 discloses a user-friendly display control device that can display various pieces of information with a layout and a timing which reflect the user's intention.

RELATED ART DOCUMENT

Patent Reference

Patent reference 1: Japanese Unexamined Patent Application Publication No. H11-311545

SUMMARY OF THE INVENTION

Problems to be Solved by the Invention

However, such a conventional information display device as disclosed in, for example, patent reference 1 is based on the premise that the user memorizes what information is displayed at which position in the screen, and therefore the user has to find out a desired display by reaching back into his or her memory. A problem is, however, that when the number of layouts of display information and the number of times that the layout is changed increase, it is difficult for the user to memorize the layouts, the times, and a relationship between the layouts and the times, and, as a result, the user cannot promptly determine to which position desired display information has been moved, and loses track of the display information.

The present invention is made in order to solve the above-mentioned problem, and it is therefore an object of the present invention to provide an information display device that can prevent the user from losing track of display information which is caused as the layout of display information is changed.

Means for Solving the Problem

In order to achieve the above-mentioned object, in accordance with the present invention, there is provided an information display device that displays display layout information having at least one piece of display information corresponding to a state of equipment on a screen, in which at least information showing a display area is included in the above-mentioned display information, and the information display device includes: a gaze judger that judges whether or not a user is gazing at the above-mentioned screen; a display area change detector that detects a change of the display area of the above-mentioned display information; a display area determinator that, when the above-mentioned display area change detector detects a change of the display area when the above-mentioned gaze judger judges that the user is gazing at the screen, determines a display area of the above-mentioned display information according to a ratio of the change of the above-mentioned display area; and a display information display that displays the above-mentioned display information according to either the display area of the above-mentioned display information included in the above-mentioned display layout information or the display area of the above-mentioned display information determined by the above-mentioned display area determinator.

Advantages of the Invention

Because even when the layout of display information is changed in a state in which the user is not gazing at the screen, the information display device according to the present invention displays the change from a state in which an original display is produced when the user is gazing at the screen by moving the display information when the user is gazing at the screen, there is provided a remarkable advantage of enabling the user to easily recognize a transition of the display of information before and after the layout is changed.

BRIEF DESCRIPTION OF THE FIGURES

FIG. 4 is a diagram showing a concrete example of list variables and an example of the operation;

FIG. 12 is a display example of a display area determined by a display area determinator in accordance with Embodiment 1;

FIG. 13 is a display example of a display area determined for information whose display is cancelled in Embodiment 1;

FIG. 17 is a flow chart showing a layout change process in accordance with Embodiment 2;

FIG. 18 is a diagram showing a display example of a screen in accordance with Embodiment 2;

EMBODIMENTS OF THE INVENTION

Hereafter, the preferred embodiments of the present invention will be explained in detail with reference to the drawings.

Embodiment 1

Figure 1:
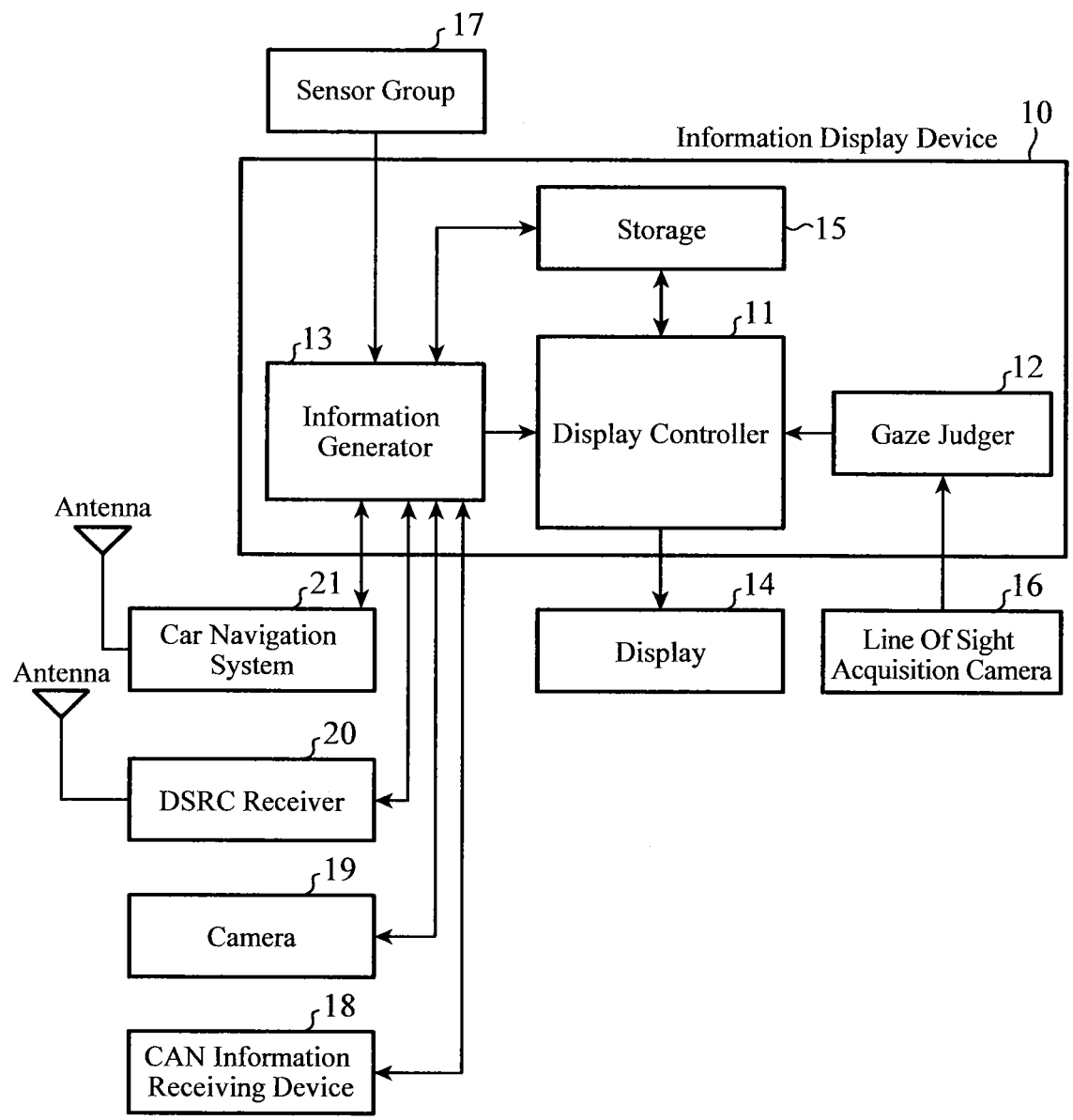
FIG. 1 is a diagram showing the entire structure of an information display device in accordance with Embodiment 1 of the present invention.

FIG. 1 is a block diagram showing the entire structure of a vehicle-mounted information display device in accordance with Embodiment 1 of the present invention. As shown in FIG. 1, the information display device 10 in accordance with Embodiment 1 includes a gaze judger 12 that acquires and judges a user's gaze, an information generator 13 that generates information to be displayed, a display 14 that displays the information generated by the information generator 13, a display controller 11 that controls a display screen displayed on the display 14, and a storage 15 that stores layout information about a display layout, etc.

The gaze judger 12 determines a gazing point which is a point on which the user is currently focusing his or her eyes from the motion of his or her eyeball by using a line of sight acquisition camera 16 that captures an image of the user's eyes, calculates whether or not the user's gazing point is on the display 14, and judges whether or not the user is gazing at the display screen. When the gazing point is on the display 14, the gaze judger sends a signal showing that the user is gazing at the screen to the display controller 11; otherwise, the gaze judger sends a signal showing that the user is not gazing at the screen to the display controller 11. As a method of detecting the user's line of sight (gazing point), instead of the line of sight acquisition camera 16 that acquires the motion of the user's eyeball, any type of unit, such as a device that determines the motion of the user's eyeball from the myoelectric potential of the user's head or the user's brain wave to detect the user's line of sight, a device that derives an object at which the user is gazing from a camera for capturing an image of the user's retina, a device that determines the motion of the user's head from a motion sensor for measuring the position and an angle of the user's head, and determines a direction in which the user is gazing, a device that statistically predicts whether or not the user is gazing at the screen by using information including the steering angle of the steering wheel, the brake amount, the distance between the vehicle and a vehicle traveling in front, the type of the road along which the vehicle is traveling, and the presence or absence of presentation using a sound, or a device that detects the user's line of sight by using a button which the user presses down when gazing at the screen, can be used as long as the unit can acquire the user's gaze at the screen.

Figure 2:
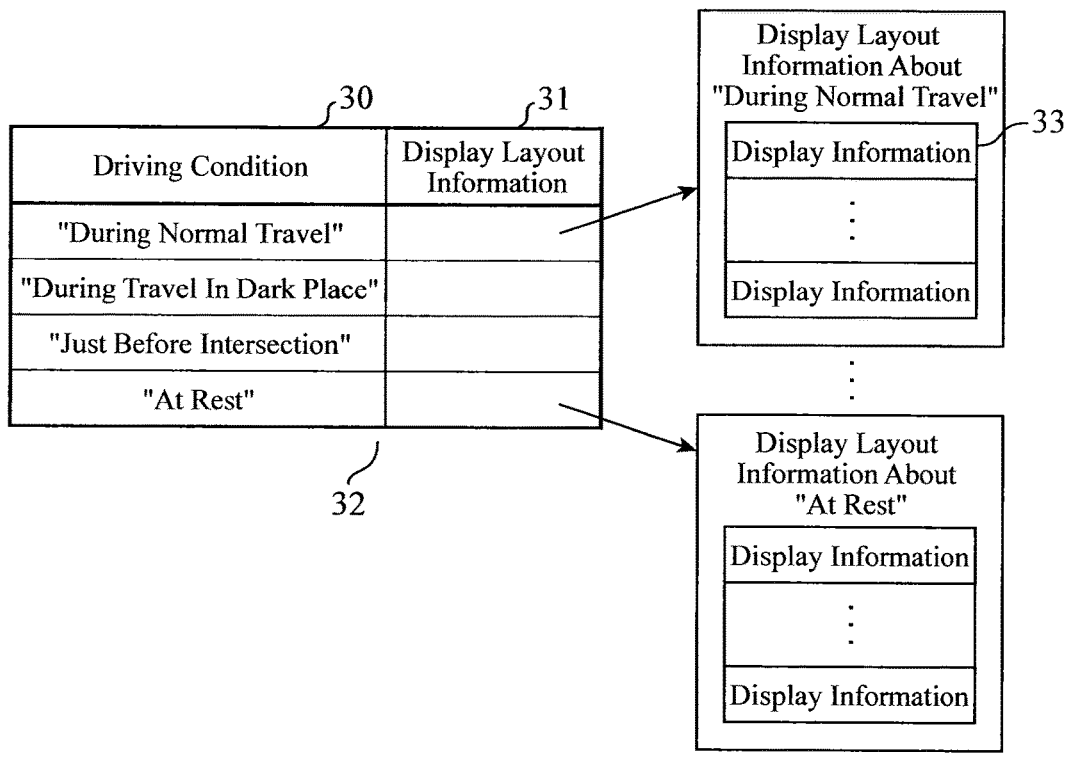
FIG. 2 is a diagram showing an association between a driving state and display layout information, and the structure of display layout information.

The information generator 13 generates and provides display information to be displayed on the display 14, and a display layout of the display information. To this information generator 13, for example, a sensor group 17 required to determine the current driving state (state of equipment), a CAN (Controller Area Network) information receiving device 18 for generating information to be shown in a speed meter and a tachometer, a camera 19 for generating an image of the surroundings of the vehicle, a DSRC (Dedicated Short Range Communication) receiver 20 for receiving a traffic state, a car navigation system 21 for generating route guide information and a map in which the current position is displayed, and so on are connected. The information generator 13 also exchanges information with the storage 15 in which a table for associating each driving state (state of equipment) with display layout information is stored. The association table 32 showing an association between each driving state (state of equipment) 30 and display layout information 31 as shown in, for example, FIG. 2 is stored in the storage 15. The display layout information 31 holds one or more pieces of display information 33. Although the example in which the information generator 13 and the display controller 11 are included in the same information display device 10 is explained above, in a case in which the information generator 13 and the display controller 11 are disposed separately in different devices, the storage 15 can be disposed independently in each of the devices.

The sensor group 17 senses information required for the generation of driving conditions which are used in order to determine the information to be displayed and the layout of the information. For example, the sensor group includes various sensors, such as a "speed sensor" that detects the vehicle speed, an "luminance sensor" that detects peripheral luminance, and a "unit for detecting whether the vehicle is traveling just before an intersection from the map information and the current position information" that detects an intersection in the case of changing the information to be displayed and the layout of the information according to the driving state which is one of various driving states, such as "during normal travel", "during travel in a dark place", "at rest," and "just before intersection."

The information generator 13 then judges the current driving state from the information acquired from the sensor group 17, the CAN information receiving device 18, the camera 19, the DSRC receiver 20, the car navigation system 21, and so on, which are connected to the information generator 13, refers to the association table 32 showing the association between each driving state 30 and display layout information 31 which is stored in the storage 15, and sends the display layout information 31 matching the current driving state and the display information 33 included in the display layout information to the display controller 11. The display controller 11 carries out a display control process of changing the information to be displayed on the display 14 and the layout of the information by using the information provided thereto from the information generator 13.

Figure 3:
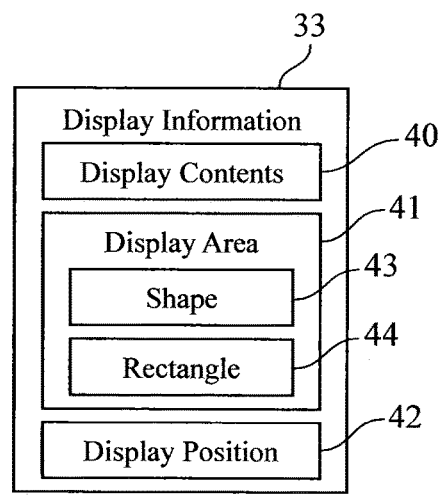
FIG. 3 is a diagram showing the structure of display information included in the display layout information.

Next, the display information 33 included in the display layout information 31 will be explained with reference to FIG. 3. FIG. 3 is a diagram showing the structure of the display information 33. As shown in FIG. 3, the display information 33 is comprised of parameters including display contents 40 showing the contents (type) of the information to be displayed, a display area 41 showing the shape of an area in which the information is displayed, and a display position 42 showing the position (an X coordinate and a Y coordinate) of the display area.

The display contents 40 serve as an ID for specifying the type of the information to be displayed. Even when the contents actually displayed differ from other contents, an identical value is set to both the display contents if they have the same meaning. For example, even when the display is changed from an analog speed meter to a digital speed meter, a value which can be uniquely specified as "speed meter" is set to both the display contents because they are the same speed meters. In addition, as the display contents 40 in accordance with this Embodiment 1, for example, "audio state", "route guidance", "tachometer", "fuel gauge", "clock", and "vehicle information" can be provided.

The display area 41 is a parameter showing the shape and the size of the display information when the display information is displayed on the screen, and is expressed by using a shape 43 and a circumscribed rectangle 44 of the shape. The display position 42 is expressed by absolute coordinates for specifying at which coordinates on the screen the display information is to be displayed. These three pieces of information (the display contents 40, the display area 41, and the display position 42) define which display information is to be displayed at which position with what size and shape, and each display information is displayed on the display 14 according to this definition.

In this case, a variable list 50 which is used for the display control process which the display controller 11 carries out, and a concrete example of the variable list are shown in FIG. 4. As shown in FIG. 4, variables including a gaze flag 51 showing whether or not the user is gazing at the screen, a gaze accumulated time 52 showing a time period during which the user has gazed at the screen after the display has been switched to the display layout information currently being provided, previous layout information 53 for storing the display layout information 31 about the screen which the user gazed previously and sufficiently, current layout information 54 for storing the display layout information used for the current display, an animation counter 55 for calculating the degree of progress (the degree of change and the ratio of change) of an animation showing a change of the layout, an animation frame length 56 defining the length of the animation per frame, an animation progress ratio 57 for storing an animation progress ratio (the degree of change in the layout and the ratio of change in the layout) which can be calculated from the animation counter 55 and the animation frame length 56, and an animation display time 58 defining a display time period of the animation are included in the variable list 50. Further, the animation frame length 56 and the animation display time 58 are constants set up at a time when the device is designed. The variable list 50 is stored in the storage 15.

Figure 5:
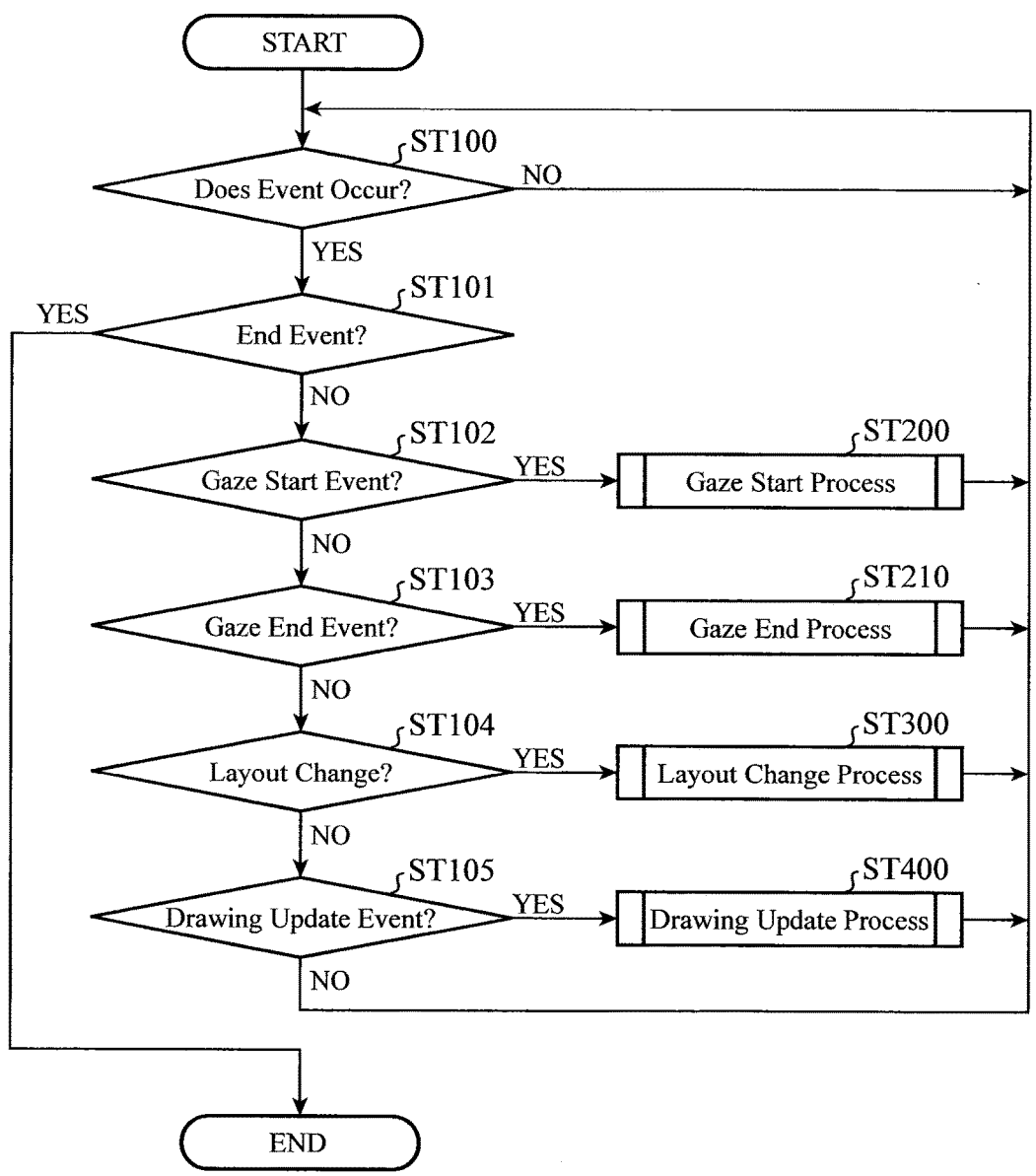
FIG. 5 is a flow chart showing a main process of a display controller in accordance with Embodiment 1.

Hereafter, the display control process which is carried out by the display controller 11 will be explained with reference to a flow chart shown in FIG. 5. FIG. 5 is the flow chart of showing a main flow of the display control process carried out by the display controller 11. As shown in FIG. 5, when detecting an event (when YES in step ST100), the display controller 11 carries out the following process according to the type of the event, while when detecting an end event, the display controller 11 ends the process (when YES in step ST101).

Figure 6:
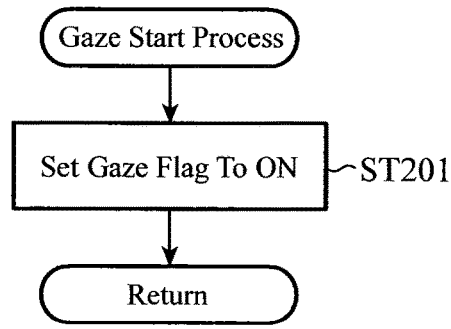
FIG. 6 is a flow chart showing a gaze start process in accordance with Embodiment 1.
Figure 7:
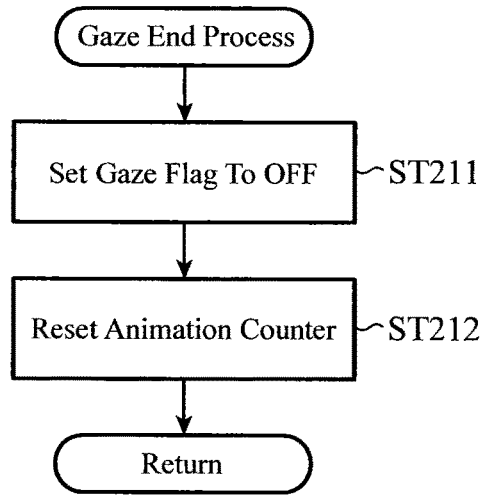
FIG. 7 is a flow chart showing a gaze end process in accordance with Embodiment 1.

When detecting a gaze start event inputted from the gaze judger 12 (when NO in step ST101 and YES in step ST102), the display controller carries out a gaze start process shown in FIG. 6 (step ST200), while when detecting a gaze end event (when NO in step ST101 and also in step ST102, and YES in step ST103), the display controller carries out a gaze end process shown in FIG. 7 (step ST210). When detecting neither a gaze start event nor a gaze end event, but detecting a change in the display layout inputted from the information generating device 14 (when NO in steps ST101 to ST103 and YES in step ST104), the display controller is triggered by the layout change to carry out a layout change process shown in FIG. 8 (step ST300). Further, when NO in steps ST101 to ST104, and a drawing update event generated at regular intervals by a timer is detected (when YES in step ST105), the display controller carries out a drawing update process shown in FIG. 9 (step ST400).

Figure 8:
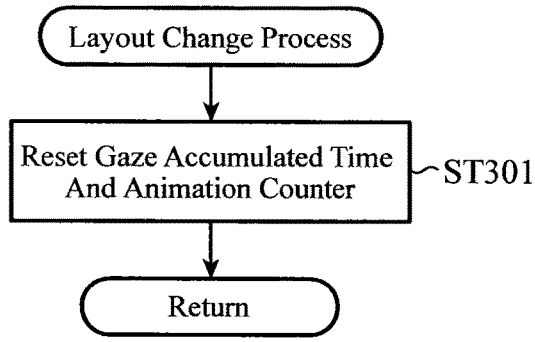
FIG. 8 is a flow chart showing a layout change process in accordance with Embodiment 1.

FIG. 6 is a flow chart showing the gaze start process carried out in step ST200 of FIG. 5. As shown in FIG. 6, when the gaze start process is started, the display controller sets a gaze flag 51 showing that the user is gazing at the display 14 to "ON" (step ST201), and ends the process as this flow and then returns to the main loop. FIG. 7 is a flow chart showing the gaze end process carried out in step ST210 of FIG. 5. As shown in FIG. 7, when the gaze end process is started, the display controller sets the gaze flag 51 to "OFF" (step ST211), and disables the display information from being moved at a time of drawing. Next, the display controller resets the animation counter 55 to "0" (zero) to cause the animation to be played back from the first frame at a time when the user starts the next gaze (step ST212), and ends the process as this flow and then returns to the main loop. FIG. 8 is a flow chart showing the layout change process carried out in step ST300 of FIG. 5. As shown in FIG. 8, when the layout change process is started, the display controller resets the gaze accumulated time 52 and the animation counter 55 to "0" (zero) (step ST301), and ends the process as this flow and returns to the main loop.

Figure 9:
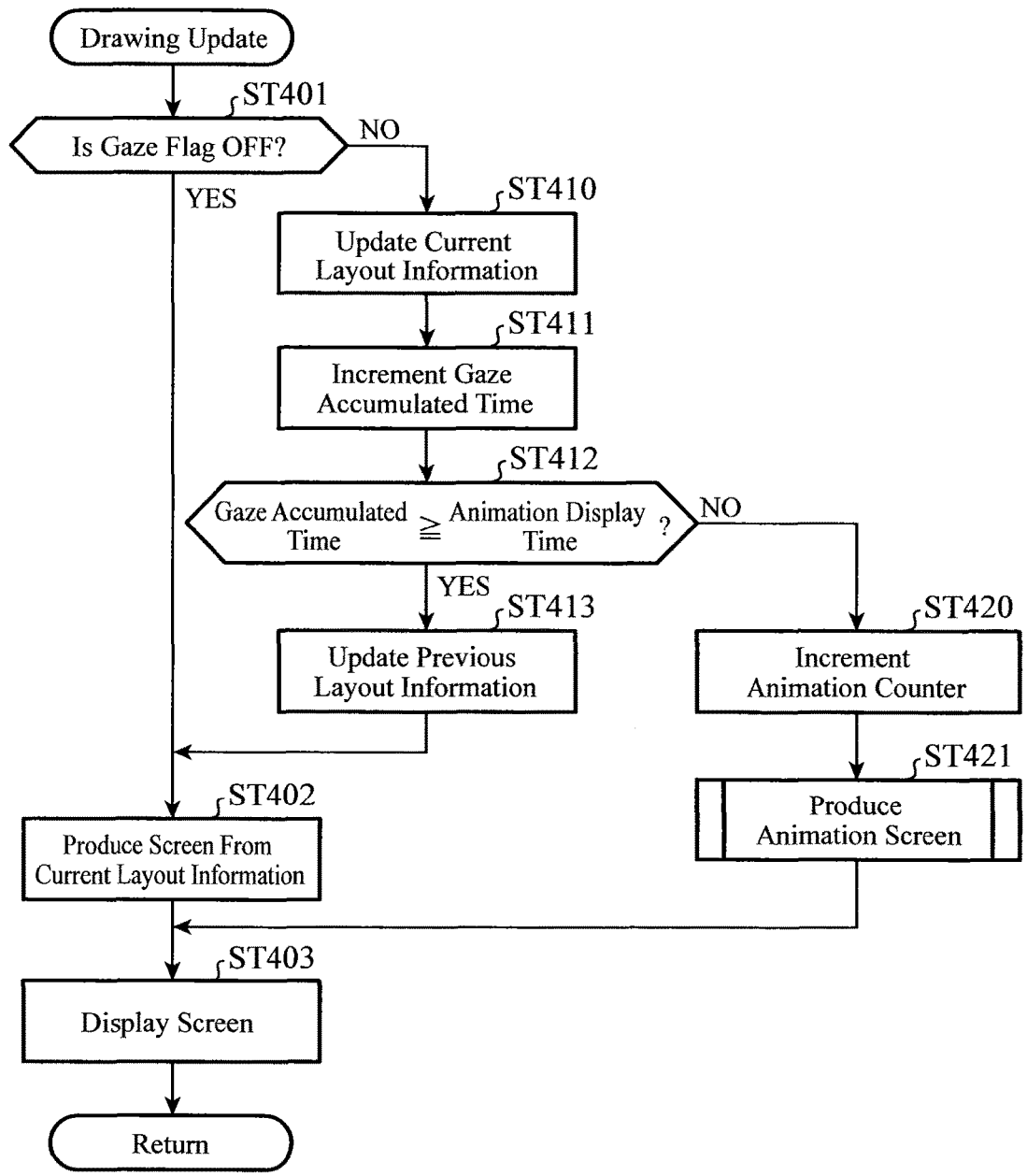
FIG. 9 is a flow chart showing a drawing update process in accordance with Embodiment 1.
Figure 10:
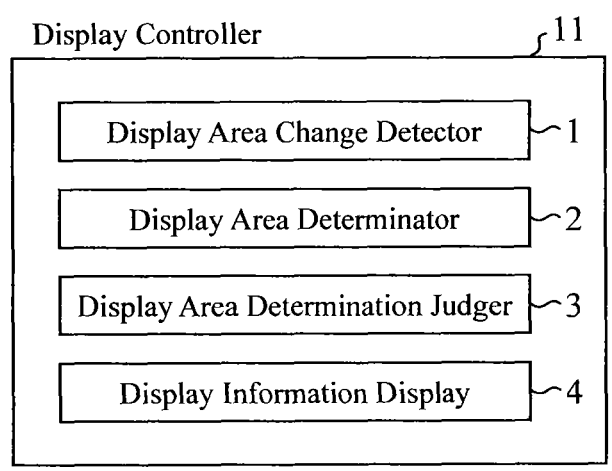
FIG. 10 is a block diagram showing the internal functions of a display controller in accordance with Embodiment 1.

FIG. 9 is a flow chart showing the drawing update process carried out in step ST400 of FIG. 5. Further, FIG. 10 is a block diagram showing the internal functions of the display controller 11. The display controller 11 includes a display area change detector 1, a display area determinator 2, a display area determination judger 3, and a display information display 4.

The display area change detector 1 detects that the display area of the display information has changed from the previous layout information 53 and the current layout information 54. When the gaze judger 12 judges that the user is gazing at the screen and the display area change detector 1 detects that the display area has changed, the display area determinator 2 determines a display area of the display information according to the degree (ratio) of change of the above-mentioned display area. The display area determination judger 3 judges whether or not to execute the display area determinator 2 according to the user's gaze accumulated time 52. The display information display 4 displays the display information according to either the display area of the display information included in the display layout information 31 or the display area of the display information determined by the display area determinator 2.

First, as shown in FIG. 9, in performing the drawing process started during the drawing update process (at fixed time intervals of 30 times per second), the display controller judges whether or not the gaze flag 51 is "ON" (or whether or not the gaze flag is "OFF") first (step ST401). When the gaze flag 51 is "OFF" (when YES in step ST401), the display controller produces a screen according to the display layout information 31 stored in the current layout information 54 (step ST402). In contrast, when the gaze graph is "ON" (when NO in step ST401), the display controller writes the display layout information 31 currently inputted thereto from the information generator 13 in the layout information 54 to update the current layout information (step ST410).

After that, the display controller increments the gaze accumulated time 52 which is managed as the cumulative total of time periods during each of which the user was gazing at the screen (step ST411). The display controller then judges whether or not the gaze accumulated time 52 is less than the animation display time 58 (e.g., whether or not the gaze accumulated time is less than 45 frames) (step ST412). When the gaze accumulated time 52 is equal to or greater than the animation display time 58 (when YES in step ST412), the display area determination judger 3 assumes that the user has sufficiently recognized a change of the layout, and overwrites the previous layout information 53 for storing the layout at which the user gazed previously with the display layout information 31 stored in the current layout information 54 to update the previous layout information 53 (step ST413), and produces a screen according to the current layout information 54 (step ST402).

In contrast, when the gaze accumulated time 52 is less than the animation display time 58 (when NO in step ST412), the display controller increments the animation counter 55 for counting the frames of the animation (step ST420). When the animation counter 55 exceeds the animation frame length 56, the display controller returns the animation counter to "0" (zero) to implement a loop of the animation. The display controller then produces a screen showing a transition from the previous layout information 53 to the layout information 54 automatically according to the animation counter 55 (step ST421). This process of producing an animation screen will be mentioned below by using FIG. 11. Then, the display information display 4 actually displays the screen produced through the process of step ST402 or ST421 of FIG. 9 on the screen of the display 14 (step ST403), and ends the process as this flow and returns to the main loop.

Hereafter, the process of producing an animation screen in step ST421 of FIG. 9 will be explained with reference to a flowchart shown in FIG. 11. The display controller calculates the degree of completion of the animation displayed first. Concretely, the display controller determines the current animation progress ratio 57 from the current animation counter 55 and the animation frame length 56, and stores the current progress ratio (step ST500). The display controller then extracts one display information from the plurality of pieces of display information which are the union of the pieces of display information 33 included in the previous layout information 53 and the pieces of display information 33 included in the current layout information 54 (step ST501). By then judging whether the extracted display information is included in the previous layout information 53 and also in the current layout information 54 (step ST502), the display area change detector 1 detects whether the display area of the display information has changed.

When the extracted display information is included in the previous layout information 53 and also in the current layout information 54 (when YES in step ST502), from both the display area of the extracted display information in the previous layout information 53 and the display area of the extracted display information in the current layout information 54, the display area determinator 2 determines an intermediate shape (intermediate coordinates) intermediate between the shapes of the circumscribed rectangles 44 of the two display areas by linear interpolation by using the animation progress ratio 57 determined in step ST500, and determines the display area in the current frame (step ST510). For example, as shown in FIG. 12, when the circumscribed rectangle J800 of the display information "speed meter" included in the previous layout information 53 (refer to FIG. 12(*a*)) is (400, 200), (400, 400), (600, 400), and (600, 200), the circumscribed rectangle J801 of the "speed meter" included in the current layout information 54 (refer to FIG. 12(*b*)) is (100, 100), (100, 400), (400, 400), and (400, 100), and the degree of progress of the animation (the degree of change in the layout and the rate of change in the layout) is 20%, the circumscribed rectangle J802 in the current animation counter 55 (refer to FIG. 12(*c*)) is (340, 180), (340, 400), (560, 400), and (560, 180). After that, the display controller draws the display information in the rectangular region formed of the determined intermediate coordinates, and draws the target display information by carrying out clipping using the shape shown in the display area (step ST511).

In contrast, when the extracted display information is neither included in the previous layout information 53 and nor included in the current layout information 54 (when NO in step ST502), the display area change detector 1 detects whether the display area of the display information has changed by judging whether or not the display information is included only in the previous layout information 53 (step ST520). When the display information is included only in the previous layout information 53 (when YES in step ST520), the display area determinator 2 determines the coordinates at the center of balance of the extracted display information by using the display area and the display position (step ST521).

Next, from the difference between the determined barycentric coordinates and each of the four sides of the screen, the display area determinator determines the direction corresponding to the smallest one of the differences between the barycentric coordinates of the display information and the four sides of the screen, i.e., the direction which is the nearest to the screen frame from the barycentric coordinates of the display information (step ST522). For example, in the case of "weather information" J810 which is the display information shown in FIG. 13 (refer to FIG. 13(*a*)), because the barycentric coordinates J820 are (200, 75) and the screen area ranges from (0, 0) to (800, 400), it can be determined that the direction corresponding to the smallest one of the differences is the negative direction of the Y-axis. The display area determinator then moves the display area in the determined direction to determine the display area J811 (refer to FIG. 13(*b*)) which all disappears from the screen (step ST523). In the example shown in FIG. 13, because the display area J810 shown by the previous layout information 53 (refer to FIG. 13(*a*)) is (20, 20), (20, 130), (180, 130), and (180, 20), the display area J811 (refer to FIG. 13(*b*)) which is formed as the result of the movement in the negative direction of the Y-axis, and whose display disappears is (20, −110), (20, 0), (180, 0), and (180, −110). The display area determinator 2 determines a display area in the current animation counter 55 by using this display area whose display disappears as the position of the movement destination of the animation (step ST510), and the display information display 4 displays the display information in the display area (step ST511).

In contrast, when the extracted display information is neither included in the previous layout information 53, nor included in the current layout information 54 (when NO in step ST502), and the display information is not included in the previous layout information 53 (when NO in step ST520), the display area determinator produces an animation showing a new display, instead of an animation showing a movement, in order to handle display information to be displayed newly by using the current layout information 54. For example, when expressing new display information by using a blink of a display area, the display area determinator determines the degree of transparency according to the animation progress ratio 57 determined in step ST500 (step ST530) and draws the display area (step ST511), thereby implementing a blink of the display area. By carrying out the above-mentioned processes on every display information included in the union of the previous layout information 53 and the current layout information 54, the display area determinator produces a screen.

Figure 14:
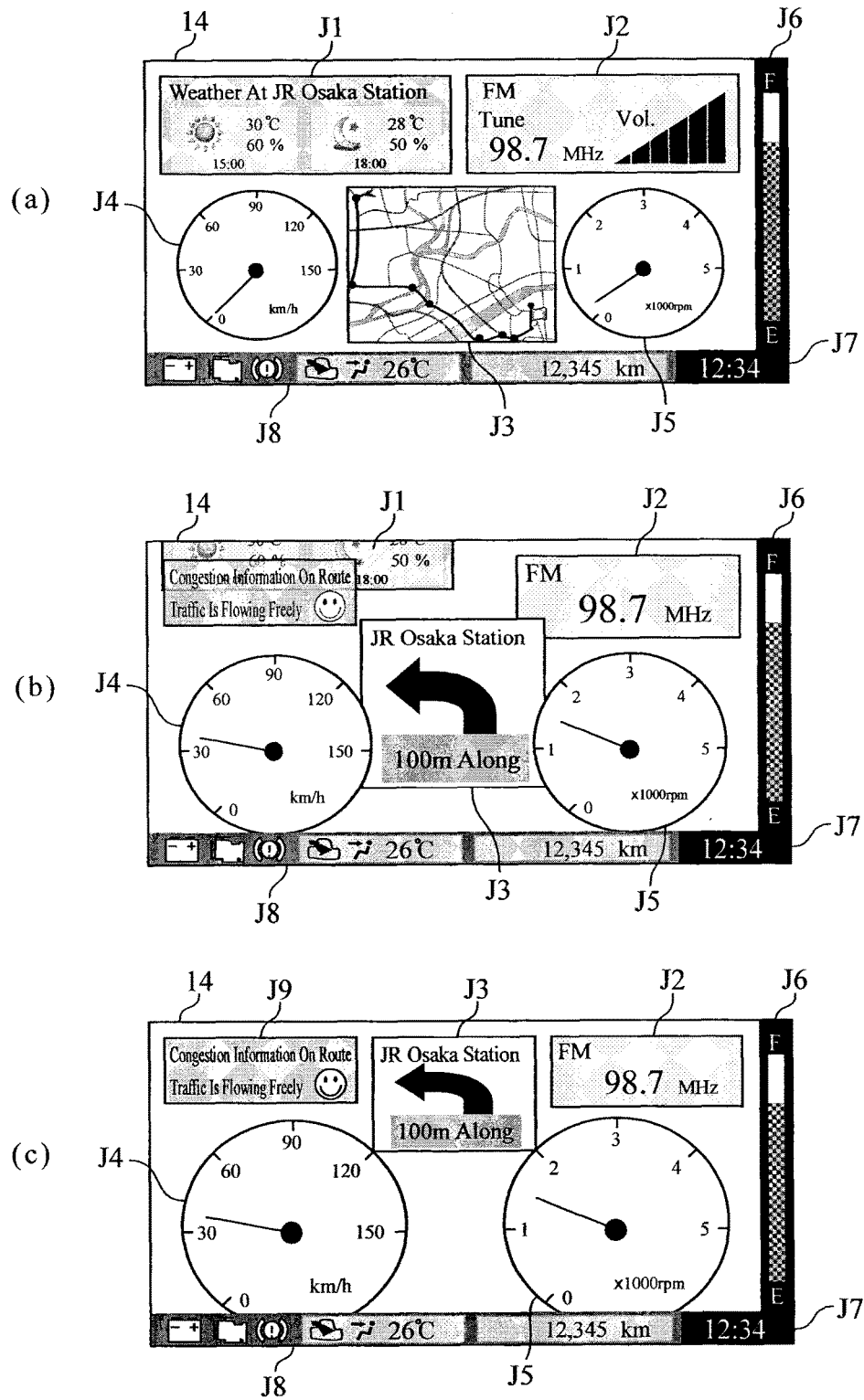
FIG. 14 is a diagram showing an example of an actual screen transition in an example of the operation in accordance with Embodiment 1.
Figure 15:
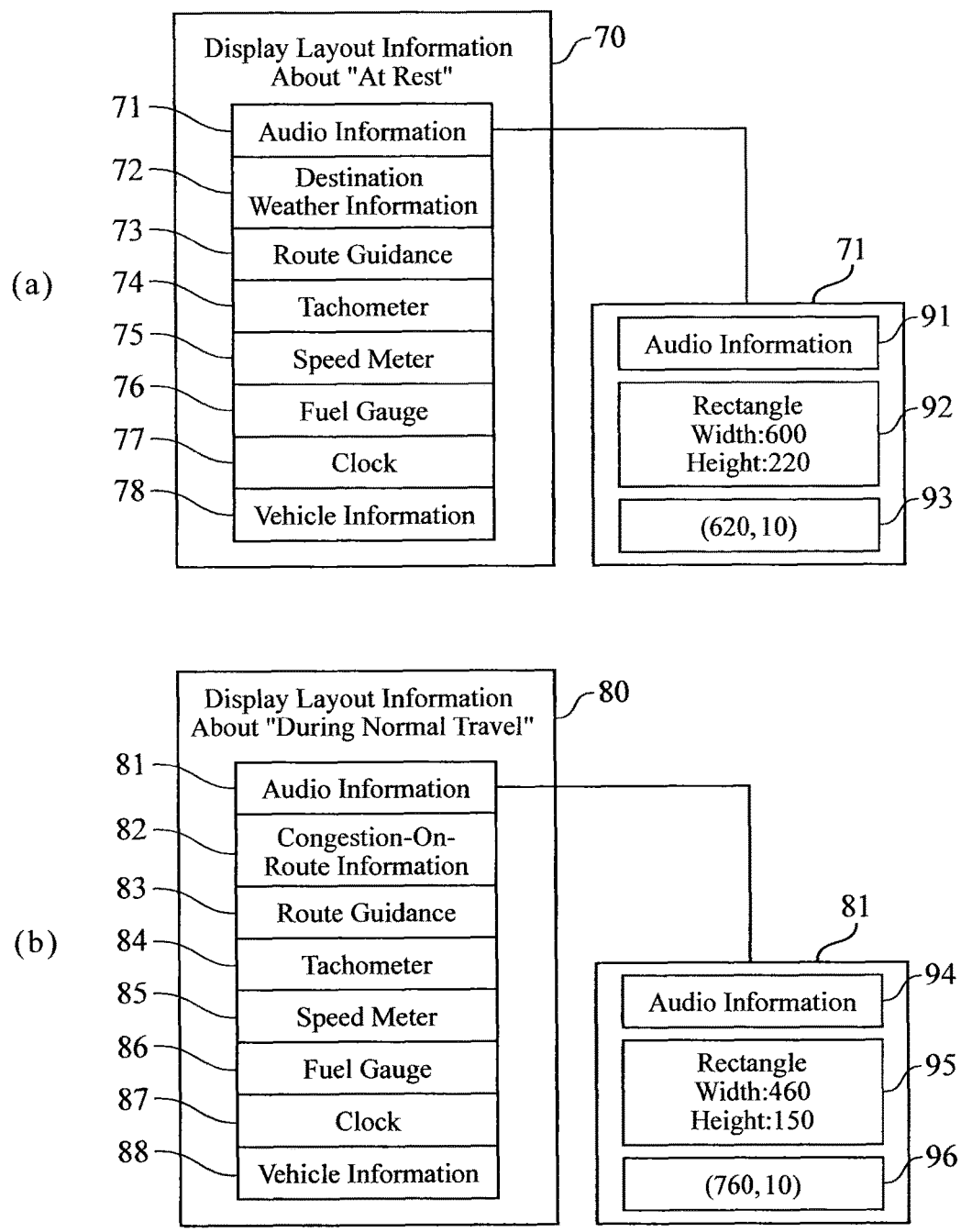
FIG. 15 is a diagram showing an example of the display layout information in an example of the operation in accordance with Embodiment 1.

A concrete example of the operation performed by the information display device 10 in accordance with this Embodiment 1 will be explained. FIG. 14 is a diagram showing a display state in which a plurality of pieces of display information are displayed on the display 14. In this example of the operation, the information generator 13 generates the pieces of display information including a speed meter J4, a tachometer J5, a clock J7, vehicle information J8, route guidance J3 to a destination, an audio state J2, weather at destination J1, and congestion information J9 on the route. The variable list in an initial state is shown in FIG. 4 (an example a of the operation), and the display layout information currently being provided from the information generator 13 is shown in FIG. 15.

When the user is not gazing at the screen and a drawing update event, which is issued at fixed time intervals (30 times per second), occurs, the drawing update process shown in FIG. 9 is carried out through the main loop shown in FIG. 5. Because the gaze flag 51 in step ST401 is "OFF" in a state in which the user is not gazing at the screen, the information display device, in step ST402, lays out each of the pieces of display information by using the display layout information 70 about "at rest" (refer to FIG. 15(a)) which is stored in the current layout information 54, and produces a screen. The screen produced is displayed in step ST403. For example, a display shown in FIG. 14(a) is produced. When the user's screen gaze is detected by the gaze judger 12 in this state, a gaze start event is issued and the gaze start process shown in FIG. 6 is carried out. The gaze flag 51 is then set to "ON" through the process of step ST201.

Then, because the gaze flag 51 at the time of the judgment in step ST401 is set to "ON" at the time of the next drawing update process, the information display device shifts to step ST410 and the display layout information 70 about "at rest" currently being provided is reflected in the current layout information 54. At this time, because the display layout information has the same value as that already stored, the current layout information 54 does not change as a result. The gaze accumulated time 52 is then incremented in step ST411, and a comparison between the gaze accumulated time 52 and the animation display time 58 is made in step ST412. At this time, because the user has just started gazing at the screen, the gaze accumulated time 54 is less than the animation display time 58 (e.g., 45 frames), and the device shifts to step ST420. The animation counter 55 is incremented in this step ST420, and the animation producing process (process shown in FIG. 11) is carried out in step ST421.

In the animation producing process, the animation progress ratio 57 is first determined and updated from the animation counter 55 and the animation frame length 56 in step ST500. After that, the information display device extracts the display information included in the current layout information 54 and the display information included in the previous layout information 53, and produces a screen in an animation. At this time, because the previous layout information 53 does not exist, the information display device causes a branch to NO in step ST502 and also in step ST520. In step ST530, the animation progress ratio 57 is converted into the degree of transparency of the display area, and the screen is drawn as an animation that appears newly. The above-mentioned processes are carried out on every display information, and blinking of all the pieces of display information is carried out as a result.

When the gaze accumulated time 52 becomes equal to or greater than the animation display time as a result of the user continuing gazing at the screen, the information display device, in step ST412, causes a branch to YES, and, in step ST413, overwrites the previous layout information with the current layout information and produces a normal screen display. As a result, the animation is stopped. The states of the variables at this time are shown in FIG. 4 (an example b of the operation). When the user stops gazing at the screen, a gaze end event occurs and the gaze end process shown in FIG. 7 is carried out. The gaze flag 51 is then set to "OFF" in step ST211, and the animation counter 55 is also reset to "0" (zero).

When the sensor group 17 then detects that the vehicle has started traveling, the driving state is changed to "during normal travel", the display layout information 80 (refer to FIG. 15(b)) corresponding to "during normal travel" starts to be provided from the association table 32 showing the association between each driving state 30 and display layout information 31 which is stored in the storage 15. As a result, a layout change event occurs and the layout change process shown in FIG. 8 is carried out. In the layout change process, the gaze accumulated time 52 and the animation counter 55 are reset to "0" (zero) in step ST301.

While the user is not gazing at the screen, a screen is drawn by using the display layout information 70 about "at rest" before the change of the driving state, the display layout information being stored in the current layout information 54, even if the drawing update process is carried out in response to a drawing update event. When the user starts gazing at the screen, the gaze flag 51 is set to "ON" through the gaze start process. When the gaze start flag is set to "ON", the animation screen producing process is carried out in the drawing update process.

In the animation screen producing process, the information display device, in step ST501, sequentially extracts all the pieces of display information included in the two pieces of display layout information about "at rest" and "during normal travel" one by one, in step ST502, judges whether each display information exists in both of the two pieces of display layout information, further, in step ST520, judges whether each display information exists only in the display layout information 70 about "at rest" stored in the previous layout information 53, and determines a display area according to the flow chart. In this example of the operation, for each of the pieces of display information including the "audio information" J2, the "route guidance" J3, the "speed meter" J4, the "tachometer" J5, the "fuel gauge" J6, the "clock" J7, and the "vehicle information" J8, which are included both in the display layout information 70 about "at rest" and in the display layout information 80 about "during normal travel", a display area in the current frame is calculated from the two display areas. However, because the position of each of the following pieces of display information: the "fuel gauge" J6, the "clock" J7, and the "vehicle information" J8 is not moved, the display area does not change as a result. Further, because the "weather at destination" J1 is included only in the display layout information 70 about "at rest", the "weather at destination" is expressed by an animation moving toward outside the screen "during normal travel." Because the "congestion information on route" J9 is included only in the display layout information 80 about "during normal travel", the "congestion information on route" is expressed by a blinking animation in which the degree of transparency of the display area changes. The states of the variables at this time are shown in FIG. 4 (an example c of the operation).

When the user continues to gaze at the screen, an animation display in which the display screen changes as shown in FIG. 14(b) or 14(c) is produced. After that, no layout change occurs until the user starts gazing at the screen, and a layout change is expressed by an animation while the user is gazing at the screen after the user has started gazing at the screen. FIG. 14(b) shows a state in which the animation progress ratio is 50%, and FIG. 14(c) shows a state in which the animation progress ratio is 100%.

As mentioned above, because the information display device in accordance with this Embodiment 1 shows a layout change by using an animation at a time when the user is gazing at the screen, the information display device can prevent the user from losing track of the display due to an automatic layout change when the user is not gazing at the screen, and enables the user to easily recognize a transition of the display of information before and after the layout has changed.

Embodiment 2

In Embodiment 1, the case in which the display information display 4 displays display information according to either the display area of the display information included in the display layout information 31 or the display area of the display information determined by the display area determinator 2 is explained. The display information display 4 can alternatively display information according to the display layout information 31 always inputted thereto from the information generator 13, and an additional information display 5 (not shown) that displays information showing a change of the layout can be disposed separately to add the information to a normal display, thereby presenting a change of the layout to the user. In Embodiment 2, this additional information display 5 is disposed separately.

More specifically, in accordance with this Embodiment 2, a display controller 11 includes a display area change detector 1, a display area determinator 2, a display area determination judger 3, a display information display 4, and the additional information display 5 as the internal functions thereof. The display information display 4 in accordance with this Embodiment 2 displays display information according to the display area of the display information included in display layout information 31. Further, the additional information display 5 displays a change of the layout according to the display area of display information determined by the display area determinator 2.

Figure 16:
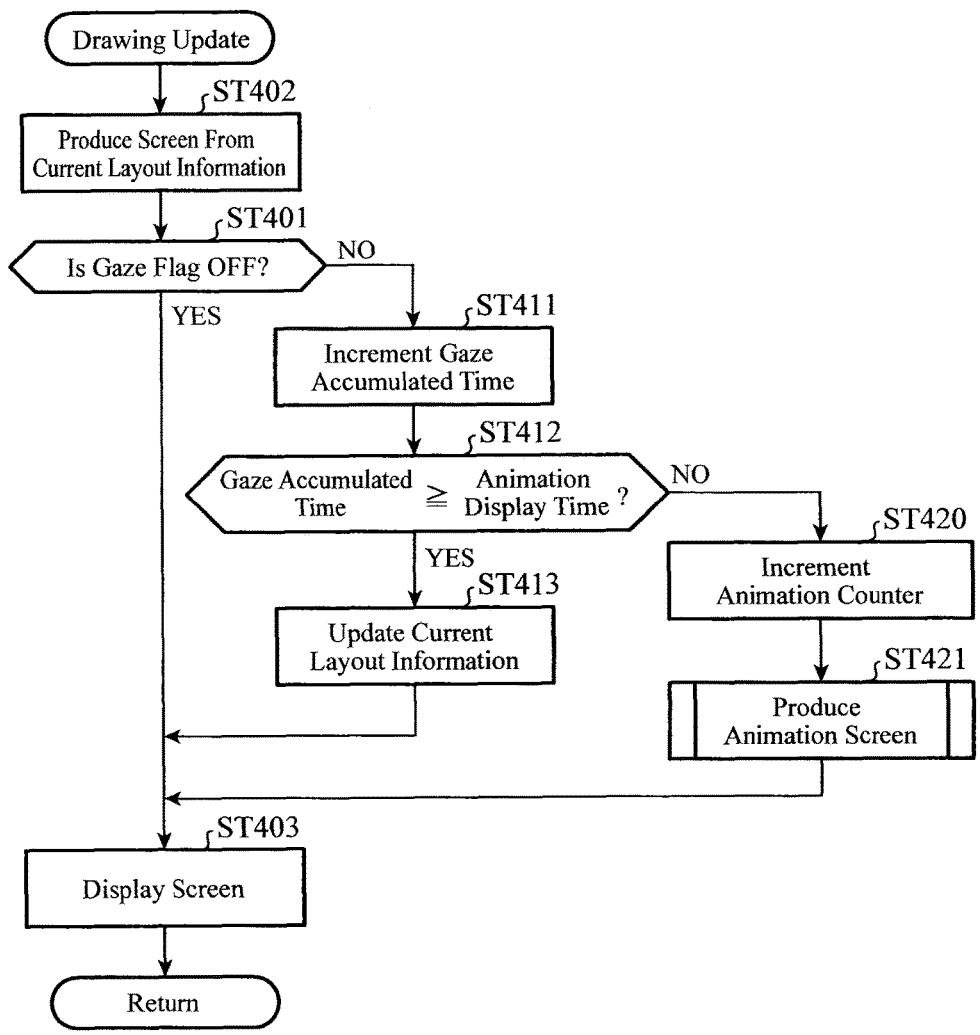
FIG. 16 is a flow chart showing a drawing update process in accordance with Embodiment 2.

Concretely, the drawing update process shown in FIG. 9 is replaced by a drawing update process shown in a flow chart of FIG. 16. According to this flow chart, the information display device draws display information by using current layout information 54 regardless of the user's gaze state. More specifically, when a drawing update event, which is issued at fixed time intervals, occurs, the information display device produces a screen from the current layout information 54 regardless of information about the user's gaze (step ST402 in FIG. 16), and then shifts to a process of producing an animation screen after detecting the user's gaze.

Further, the layout change process shown in FIG. 7 is replaced by a layout change process shown in FIG. 17. According to this flow chart, the information display device updates the current layout information 54 to the newest display layout information provided thereto from the information generator 13. More specifically, when a layout change event occurs, such as when the vehicle starts traveling and the driving state changes from "at rest" to "during normal travel", the information display device resets a gaze accumulated time 52 and an animation counter 55 to "0" (zero) (step ST301), and also updates the current layout information 54 to the newest display layout information (step ST410 in FIG. 17).

Figure 11:
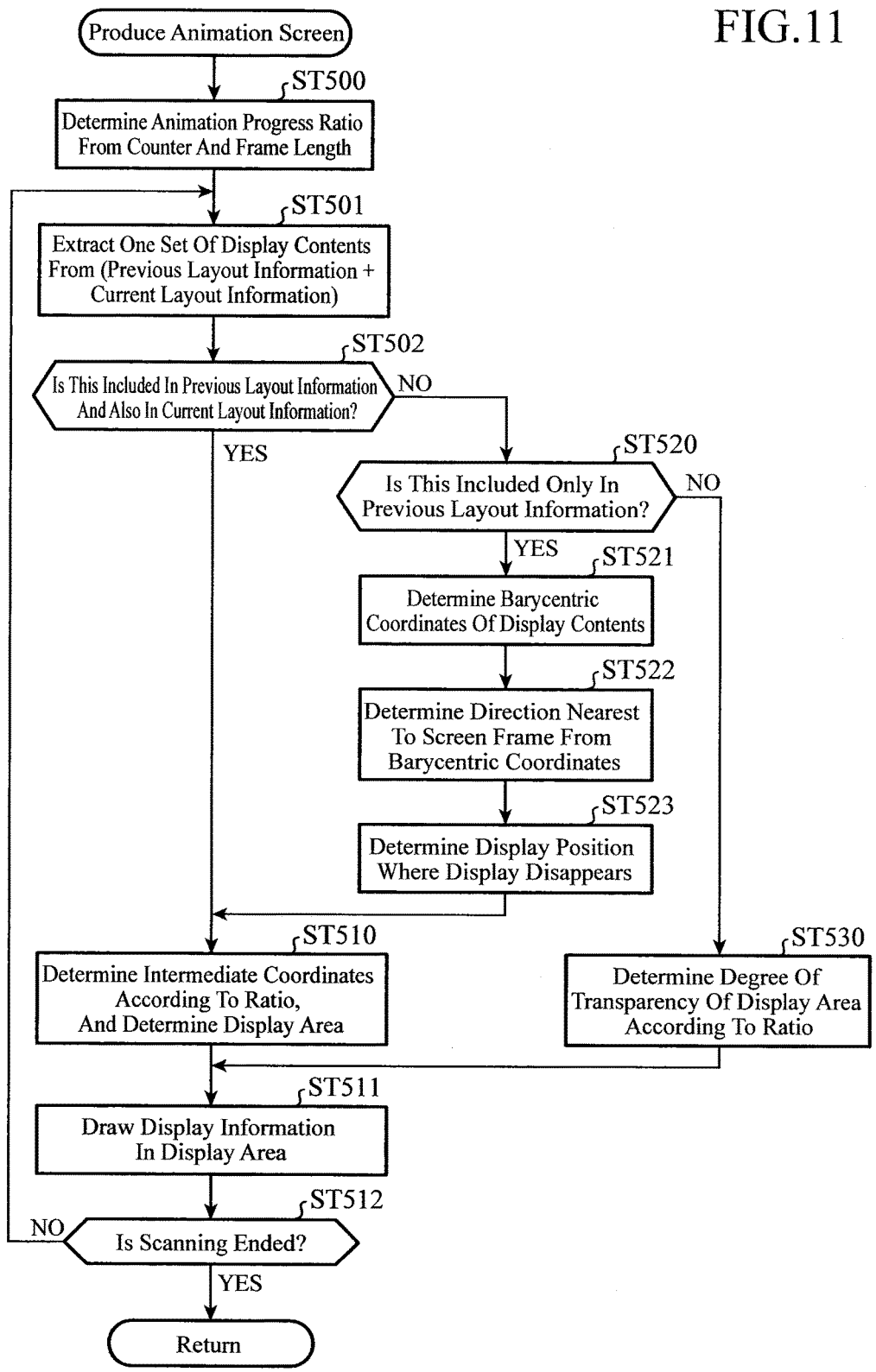
FIG. 11 is a flow chart showing an animation screen producing process in accordance with Embodiment 1.

In addition, in the flow chart of the animation screen generation shown in FIG. 11, in a process of producing a screen (step ST511), instead of the display information display 4 drawing display information, the additional information display 5 carries out a process of drawing the layout change by displaying additional information including the outer frame of the area determined by the display area determinator 2 and an arrow extending from the center of the area to the center.

An example of displaying the additional information this way is shown in FIG. 18. FIG. 18(a) shows an example of the screen in which a change of the layout is displayed by displaying the outer frame of the display area determined by the display area determinator 2. Although the outer frame of the display area is displayed in this example of FIG. 18(a), the display area (whole display area) can be alternatively displayed when the display area does not have an outer frame.

Further, FIG. 18(b) shows an example of the screen in which a change of the layout is displayed by displaying an arrow extending from the center of the display area before the layout change to the center of the display area after the layout change on the basis of the display area determined by the display area determinator 2. Although the arrow extending from the center of the display area to the center is displayed in this example of FIG. 18(b), when the display area has a rectangular shape, an arrow extending from an arbitrary position in the display area before the layout change to a corresponding arbitrary position in the display area after the layout change, such as an arrow extending from the upper left vertex of the display area before the layout change to the upper left vertex of the display area after the layout change, can be displayed.

As mentioned above, the information display device in accordance with this Embodiment 2 displays a change of the layout by using additional information at a time when the user is gazing at the screen after changing the layout at a time when the driving state changes, instead of changing the layout of display information at a time when the user is gazing at the screen. Therefore, the information display device produces an animation display only for the additional information while making the display information which the user needs to read stationary. As a result, because the user is enabled to keep track of a display transition while recognizing the display contents visually when the user is gazing at the screen, the user can easily perform visual recognition on the display information.

Embodiment 3

Figures 19, 20:
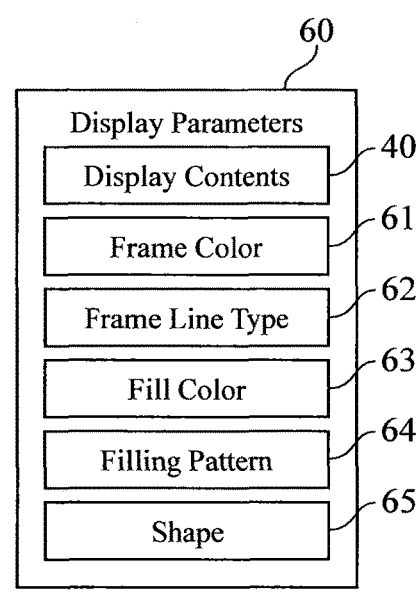
FIG. 19 is a diagram showing a table defining priorities in accordance with Embodiment 3.
FIG. 20 is a diagram showing display parameters in accordance with Embodiment 5.

Although the degree of overlap when animations overlap each other is not taken into consideration particularly in Embodiments 1 and 2, a table 45, as shown in FIG. 19, which defines priorities 46 each of which is uniquely determined for display contents 40 is prepared for each display information used by the display area determinator 2, and, when an animation overlaps another animation, display information having higher priority can be displayed in a further front area. In Embodiment 3, this table 45 is applied. More specifically, information defining a priority is also included in each display information, and, when a plurality of pieces of display information are provided and the display areas determined for the plurality of pieces display information by the display area determinator 2 overlap each other, display information having higher priority is displayed in a further front area.

When extracting one display information in step ST501 of the flow chart of the animation screen generation shown in FIG. 11, the information display device refers to the table 45 shown in FIG. 19, sequentially extracts the pieces of display information in ascending order of display priority, and, in step ST511, sequentially displays the pieces of display information in ascending order of priority. As a result, display information having a higher priority is drawn at a later time and is displayed in a further front area. This table 45 is stored in a storage 15.

As mentioned above, the information display device in accordance with this Embodiment 3 can control information to be displayed on a priority basis when the display areas of a plurality of pieces of display information overlap each other. More specifically, the information display device can prevent display information which has to be provided for the user, such as the speed meter of the vehicle, from being covered by other display information, and can give priority to the display of important display information having a high priority.

Embodiment 4

Figures 30, 31:
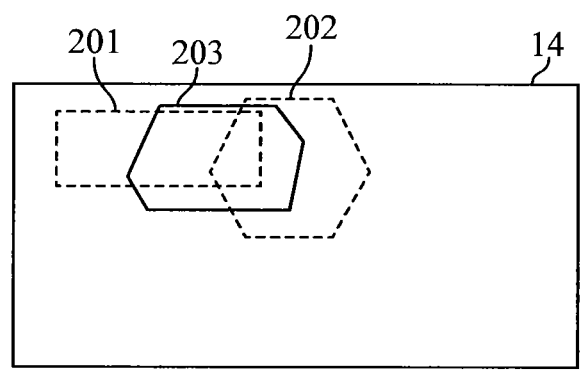
FIG. 30 is an example of transformation into a graphic having a different number of vertexes in Embodiment 8.
FIG. 31 is a diagram showing a table defining permitted display contents in accordance with Embodiment 4.

Although no limitations are particularly imposed on the display device that implements an animation in Embodiments 1 to 3, when the display areas determined by the display area determinator 2 overlap each other, a table 47, as shown in FIG. 31, which defines display contents which are permitted to be displayed can be referred to and only the display contents defined by this table 47 can be displayed.

Figure 32:
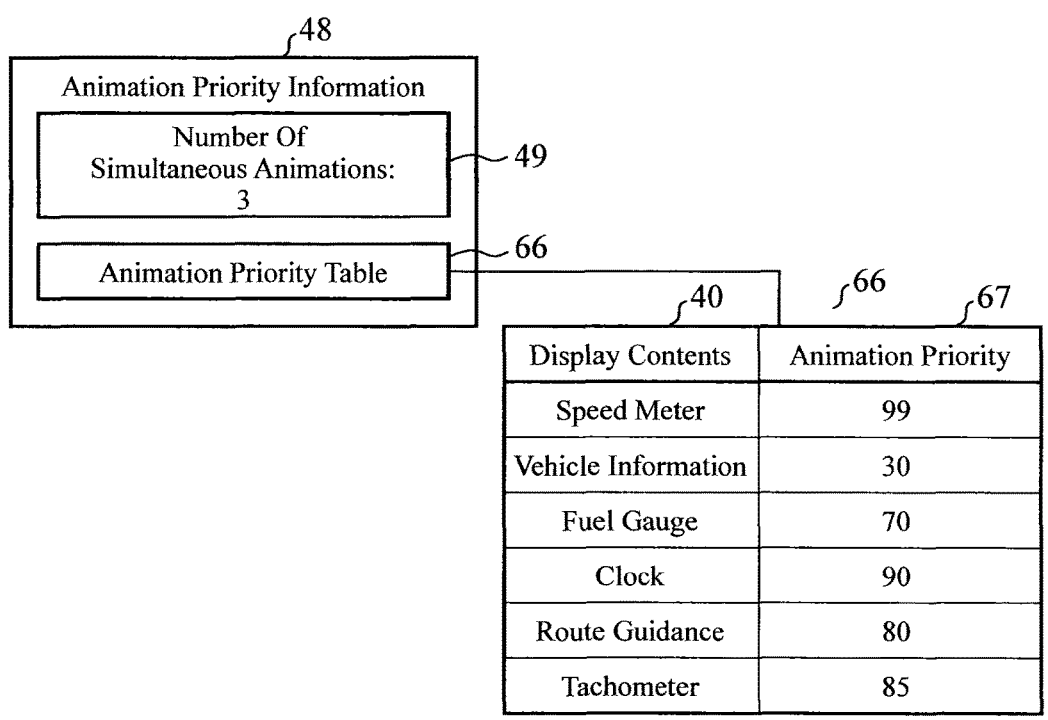
FIG. 32 is a diagram showing an animation priority table in accordance with Embodiment 4.

Further, because if a plurality of animations are implemented simultaneously when the display areas determined by the display area determinator 2 overlap each other, they are hard for the user to recognize visually, animation priority information 48, as shown in FIG. 32, which defines permission to produce a display of a continuous change can be held. As shown in FIG. 32, the animation priority information 48 is comprised of the number of simultaneous animations 49, which can be simultaneously implemented, and an animation priority table 66.

The number of simultaneous animations 49 can be preset arbitrarily, and it is assumed hereafter that 3 is set as the number of simultaneous animations. The animation priority table 66 defines display contents and animation priorities. This table 66 is prepared and referred to, so that when a plurality of animations overlap each other, an animation display process is carried out on animations whose number is defined by the number of simultaneous animations 49 in such a way that they are implemented in order of descending animation priority.

For example, when a transition from a state of FIG. 14(*a*) to a state of FIG. 14(*c*) is made, the number of display contents for which animations are simultaneously implemented is determined to be three from the number of simultaneous animations 49 shown in FIG. 32. When the animation priority table 66 is then referred to and it is determined that the display contents are a speed meter, a clock, and a tachometer because they are the three display contents having higher priorities, the three display contents: a speed meter J4, a tachometer J5, and a route guidance J3 are displayed with animations while other display contents are displayed without animations until route guidance having the next higher priority is provided because there is no change in the display position and the size of the clock J7.

More specifically, in accordance with this Embodiment 4, the animation priority information 48 defining permission to produce a display of a continuous change is also included in each display information, and the information display device carries out a process of producing a display of a continuous change only on display information for which a display of a continuous change (animation display) is permitted but does not carryout a process of producing an animation display which is a display of a continuous change on other display information.

As mentioned above, the information display device in accordance with this Embodiment 4 can control information for which a process of producing an animation display is carried out on a priority basis when a plurality of animation displays are produced simultaneously. More specifically, the information display device gives a higher priority to an animation display of display information, such as the speed meter of a vehicle, whose display position needs to be surely recognized by the user, thereby being able to prevent the screen from becoming complicated.

Embodiment 5

Although the color, the pattern, etc. of an animation are not taken into consideration particularly in Embodiments 1 to 4, the display contents of each display information can be displayed by using at least one of a frame color 61, a frame line type 62, a fill color 63, a filling shading pattern (filling pattern) 64, and a shape 65 of an animation which are defined as specific display parameters 60. In accordance with Embodiment 5, each animation is displayed with the color, the pattern, etc. thereof according to these specific display parameters 60.

Figure 21:
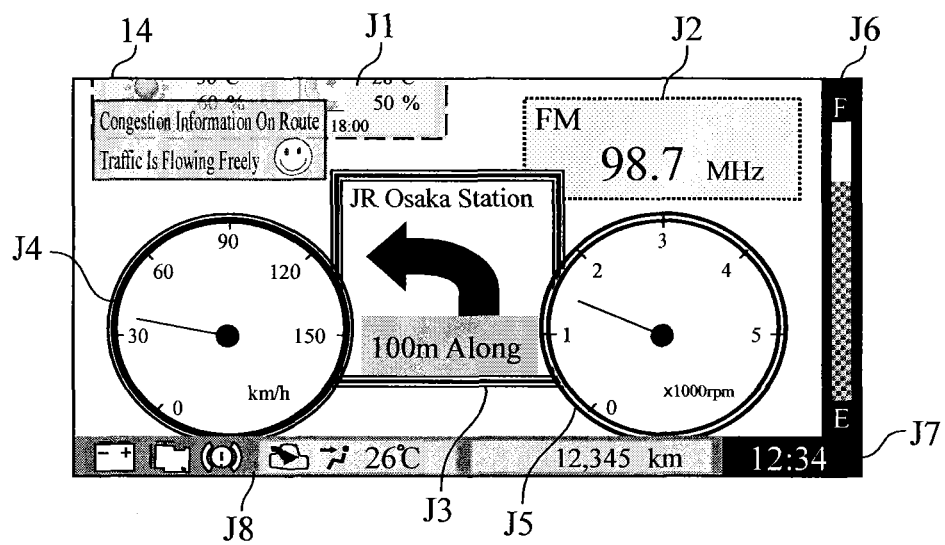
FIG. 21 is a diagram showing a display example of a screen in accordance with Embodiment 5.

At the time of producing a screen in step ST502 of the flow chart of animation screen generation shown in FIG. 11 the display contents of each display information are displayed by using at least one of the frame color 61, the frame line type 62, the fill color 63, the filling shading pattern (filling pattern) 64, and the shape 65 of the animation, as shown in FIG. 20, which are defined as the specific display parameters 60. These display parameters 60 are stored in a storage 15. For example, when the frame line type is fixed for the display contents of each display information, a screen as shown in FIG. 21 is displayed. As a result, even when pieces of display information resembling each other, such as a "speed meter" J4 and a "tachometer" J5, are displayed, by making their frame colors 61, frame line types 62, etc. differ from each other, the user is enabled to keep track of a display transition of each display information without confusing the display contents of the pieces of display information.

As mentioned above, even when a plurality of pieces of display information are moved while being in confusion, the information display device in accordance with this Embodiment 5 makes the frame color, the frame line type, etc. of an animation be different for the display contents of each of the plurality of pieces of display information. Therefore, the information display device can prevent a display transition, such as a movement of display information, from being hard for the user to understand while preventing the user from confusing the display contents of the pieces of display information.

Embodiment 6

Although preset constant values are used as the animation display time 58 and the animation frame length 56 used for the comparison by the display area determination judger 3 in Embodiments 1 to 5, the animation display time 58 and the animation frame length 56 can be values which can vary according to the driving state (state of equipment). In accordance with Embodiment 6, these animation display time 58 and animation frame length 56 are values which can vary according to the driving state (state of equipment).

Figure 22:
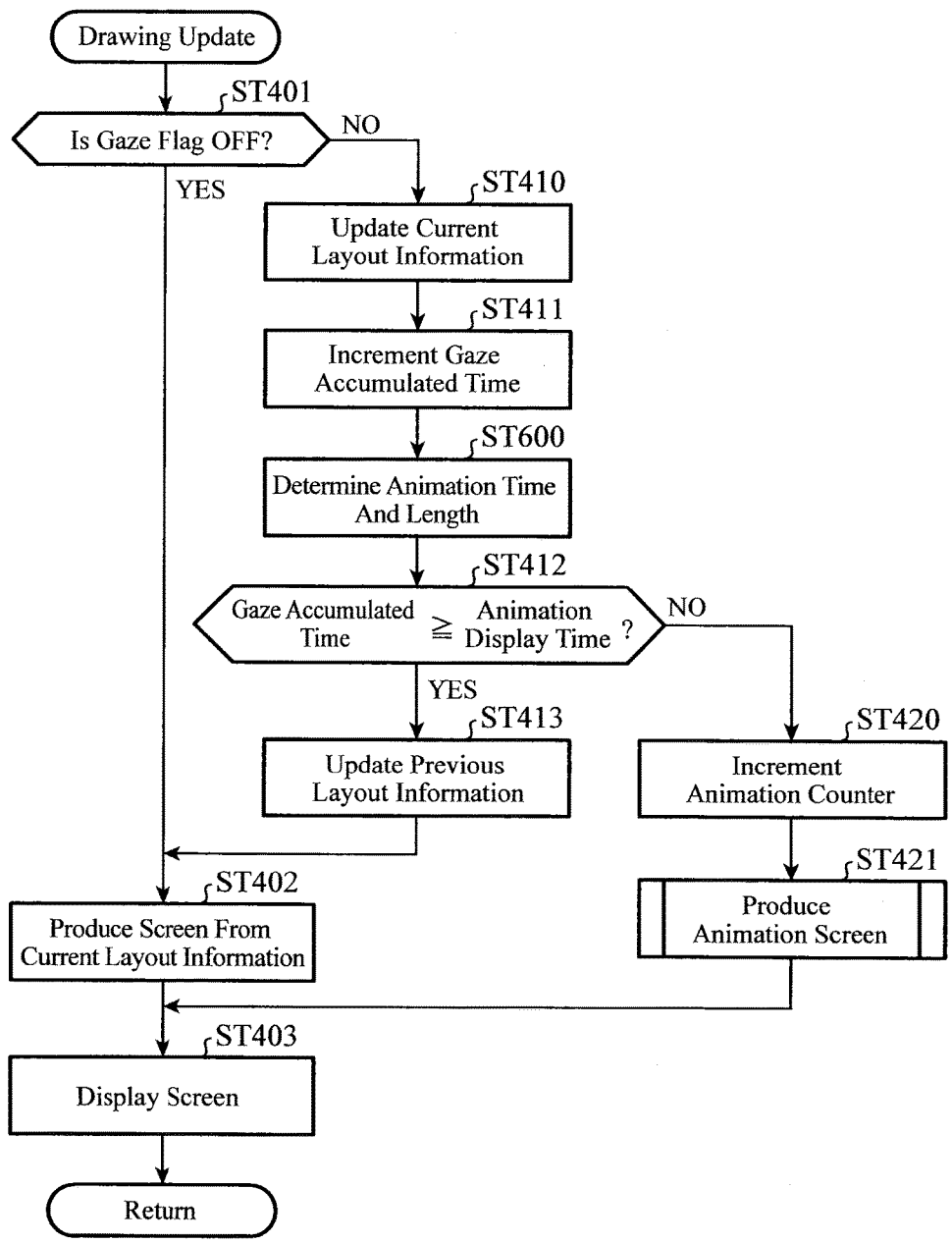
FIG. 22 is a flow chart showing a drawing update process in accordance with Embodiment 6.
Figures 23, 24:
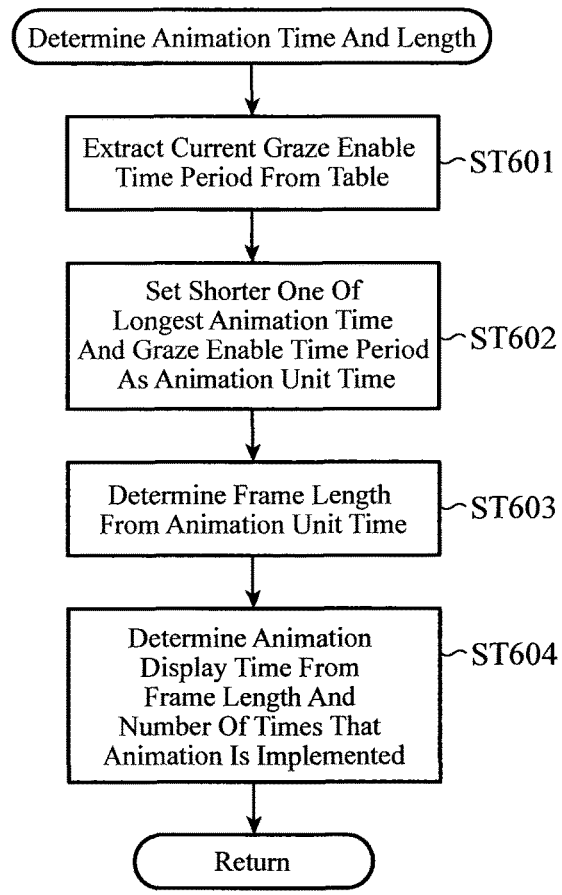
FIG. 23 is a diagram showing a table defining a gaze enable time period in accordance with Embodiment 6.
FIG. 24 is a flow chart showing a process of determining an animation display time and an animation frame length in Embodiment 6.

In this Embodiment 6, the drawing update process shown in FIG. 9 is replaced by a drawing update process shown in a flow chart of FIG. 22. In the flow chart shown in this FIG. 22, after a gaze accumulated time 52 is incremented in step ST411, a process of determining the animation display time 58 and the animation frame length 56 is carried out (step ST600). In this step ST600, a gaze time-to-spare table 100, as shown in FIG. 23, which defines a time period during which the user can be gazing at the screen, i.e., a gaze enable time period 102 for each driving state (state of equipment) 101 is referred to determine the animation display time 58 and the animation frame length 56. This gaze time-to-spare table 100 is stored in a storage 15.

The process of step ST600 is carried out according to a flow chart shown in, for example, FIG. 24. FIG. 24 is a flow chart showing the process of determining the animation display time and the animation frame length. First, a gaze enable time period matching the current driving state is extracted from the gaze time-to-spare table 100 shown in FIG. 23 (step ST601). A shorter one of the extracted gaze enable time period and the longest animation time (e.g., 500 ms) at a time when an animation is displayed most slowly is decided as a one-time animation time (step ST602). Then, the animation frame length 56 is determined by using a drawing update cycle in such a way as to satisfy the one-time animation time (step ST603). More specifically, this animation frame length 56 is made to change (change dynamically) on the basis of the gaze enable time period extracted in step ST601.

Finally, the animation display time 58 is determined from the animation frame length 56 determined in step ST603, and the number of times (e.g., three times) that it is desirable to provide the animation for the user (step ST604), and the processing is ended as this process and the sequence returns to the flow chart shown in FIG. 22. More specifically, this animation display time 58 is also made to change (change dynamically) on the basis of the gaze enable time period extracted in step ST601.

Because the information display device can implement an animation display taking into consideration the user's state of being able to gaze at the screen according to the current driving state (state of equipment) by doing this way, the information display device can notify a display transition of display information more surely by displaying the animation at a speed at which the user is enabled to finish viewing the animation in a short time when, for example, the user is driving a vehicle in a state in which the user is left little time for gazing at the screen.

Figure 25:
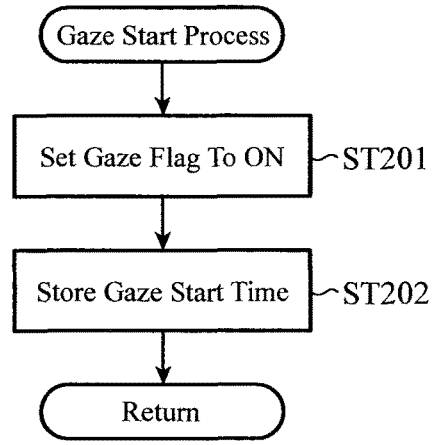
FIG. 25 is a flow chart showing a gaze start process in accordance with Embodiment 1.
Figure 26:
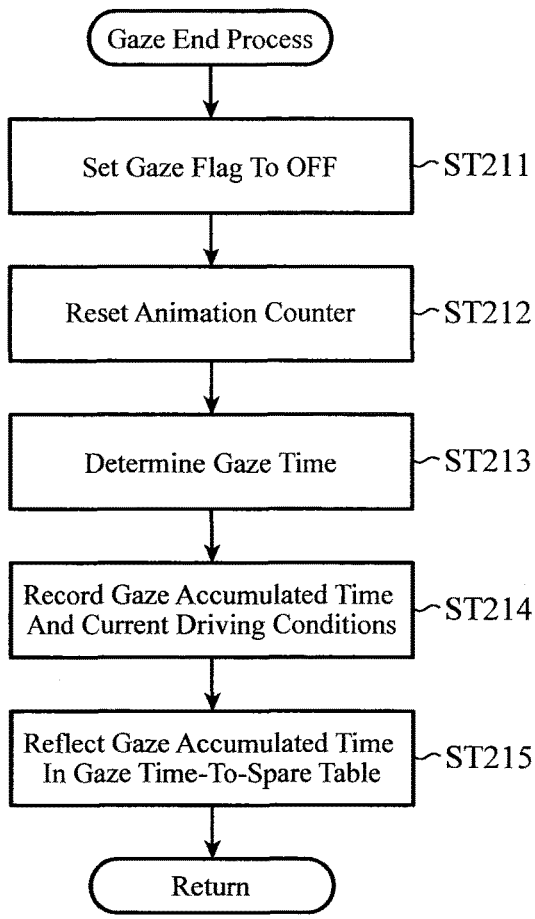
FIG. 26 is a flow chart showing a gaze end process in accordance with Embodiment 6.

In addition, the information display device can be constructed in such a way as to include a unit of learning this gaze time-to-spare table 100, i.e., the gaze enable time period 102 from a time period during which the user was actually gazing at the screen. Concretely, the gaze start process shown in FIG. 6 is replaced by a gaze start process shown in a flow chart of FIG. 25 and the gaze end process shown in FIG. 7 is replaced by a gaze end process shown in a flow chart of FIG. 26. At a time when the user starts gazing at the screen, the gaze start time is recorded (step ST202) after a gaze flag 51 is set to "ON" in step ST201. Further, in the gaze end process, after the gaze flag 51 is set to "OFF" in step ST211 and an animation counter is reset to "0" (zero) in step ST212, a real gaze time is determined by a computation expression of (current time−gaze start time) (step ST213). Then, a gaze accumulated time which is measured while being associated with the current driving state is recorded (step ST214). Finally, the gaze enable time period in the gaze time-to-spare table 100 is updated to the gaze accumulated time measured (step ST215).

In the process of step ST215, when the gaze enable time period (time to spare) corresponding to, for example, a case of 95% or more is set, i.e., when a time period which can include 95% or more of a plurality of real gaze time periods recorded every time when the user gazes at the screen is set as the gaze enable time period (time to spare), the gaze enable time period in the gaze time-to-spare table 100 is overwritten with the gaze time period, as the gaze enable time period, which corresponds to 5% of the sum total of the gaze time periods which is acquired by summing them starting from the shortest gaze time period in the set of gaze time periods recorded in step ST214. In a case in which the number of recorded samples is small, a set of gaze time periods is estimated by assuming that the gaze time periods follow a normal distribution, the gaze time period corresponding to 5% of the sum total of the gaze time periods is determined, and the gaze enable time period in the gaze time-to-spare table 100 is updated.

Because the gaze enable time period can be corrected through a real use by thus learning the gaze accumulated time and determining the gaze enable time period, the accuracy of the time to spare according to each condition to be predicted can be improved during the real use, and an animation which is more suited to the user's gaze enable time period can be produced.

As mentioned above, the information display device in accordance with this Embodiment 6 can display an animation suitable for the time to spare which the user has according to the current driving state, and enables the user to recognize the animation visually under any conditions. Further, the accuracy of the time to spare according to each condition to be predicted can be improved during a real use, and an animation which is more suited to the user's gaze enable time period can be produced.

Embodiment 7

Although the time period during which the user is gazing at the screen is incremented and accumulated to determine the gaze accumulated time 52 every time when a drawing update is carried out in Embodiments 1 to 6, a varying value different from the accumulated time period during which the user was actually gazing at the screen, such as a value which is counted only after the user finishes viewing an animation once, can be determined as the gaze accumulated time. In accordance with Embodiment 7, a value varying according to the completion of an animation is determined as this gaze accumulated time 52.

Figure 27:
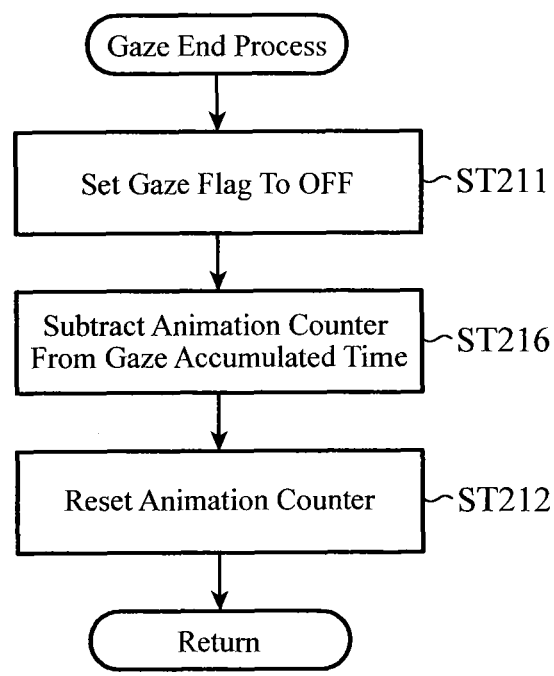
FIG. 27 is a flow chart showing a gaze end process in accordance with Embodiment 7.

Concretely, for example, the gaze end process shown in FIG. 7 is replaced by a gaze end process shown in a flow chart of FIG. 27. During a drawing update process, for a gaze accumulated time 52 used for a comparison for assuming that the user has sufficiently recognized a change of the layout, a display area determination judger 3 subtracts an animation counter 55 from the gaze accumulated time 52 at a time of carrying out the gaze end process shown in FIG. 27. More specifically, the display area determination judger, in step ST211 of the gaze end process, sets a gaze flag 51 to "OFF", and, after determining a gaze time period by subtracting the animation counter 55 from the gaze accumulated time 52 (step ST216), resets the animation counter to "0" (zero) in step ST212.

Figure 28:
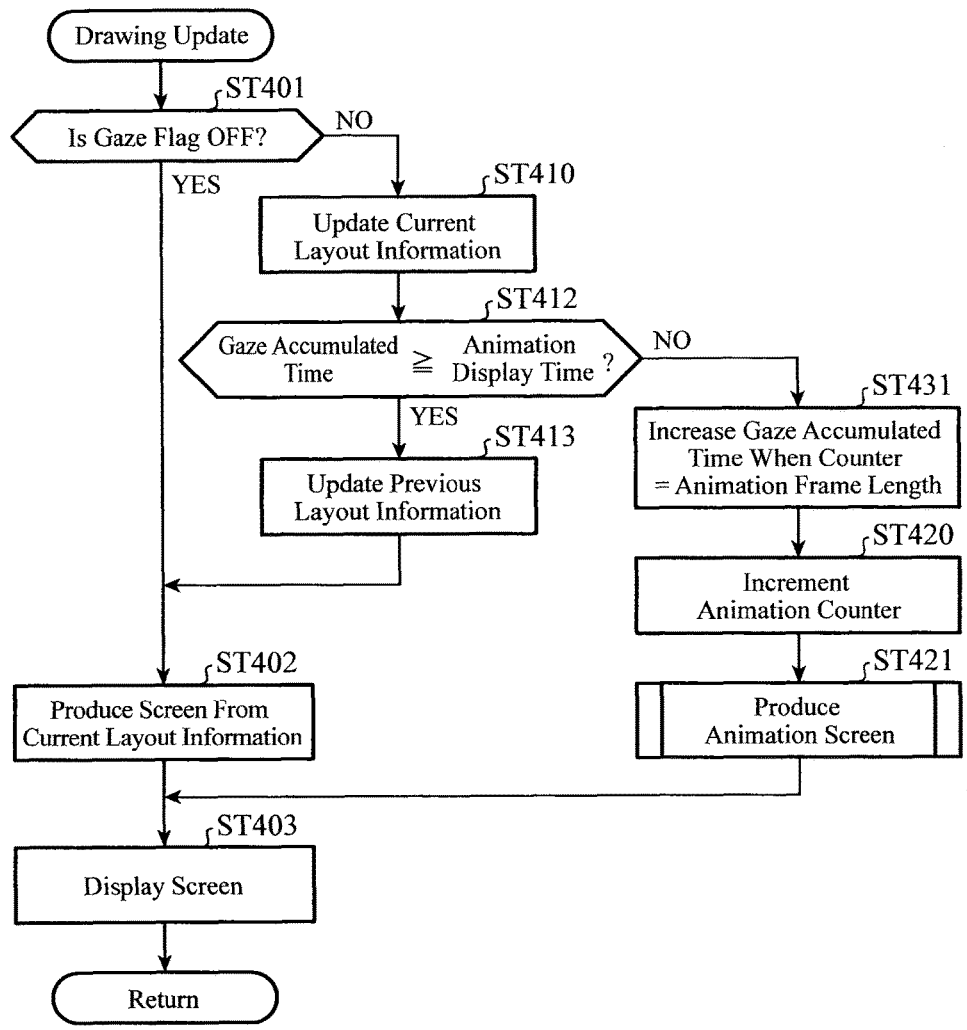
FIG. 28 is a flow chart showing a drawing update process in accordance with Embodiment 7.

Further, as another example, the drawing update process shown in FIG. 9 is replaced by a drawing update process shown in a flow chart of FIG. 28. As shown in the flow chart shown in FIG. 28, a process of incrementing the gaze time period which is carried out in step ST411 of FIG. 9 can be carried out before the animation counter 55 is incremented in step ST420, and an animation frame length 56 can be added to the gaze accumulated time 52 only when the animation counter 55 is equal to an animation frame length (step ST431).

As mentioned above, the information display device in accordance with this Embodiment 7 counts the gaze accumulated time period only after the user finishes viewing an animation once, the information display device can eliminate the user's gazes in an extreme short time, such as gazing at the display 14 only for a moment, and a gaze which is assumed to occur due to chattering occurring in a gaze judger 12 or an erroneous recognition or the like done by the gaze judger 12, the information display device enables the user to surely view an animation.

Embodiment 8

In Embodiments 1 to 7, it is explained that the display area 41 of display information 33 included in the previous layout information 53 and the display area 41 of the display information 33 also included in the current layout information 54 have the same shape, and a case in which they have different shapes is not taken into consideration particularly. In Embodiment 8, a pre-process of, when the display area 41 of display information 33 has a different shape in the previous layout information 53 and in the current layout information 54, equalizing the number of vertexes between them is introduced.

Figure 29:
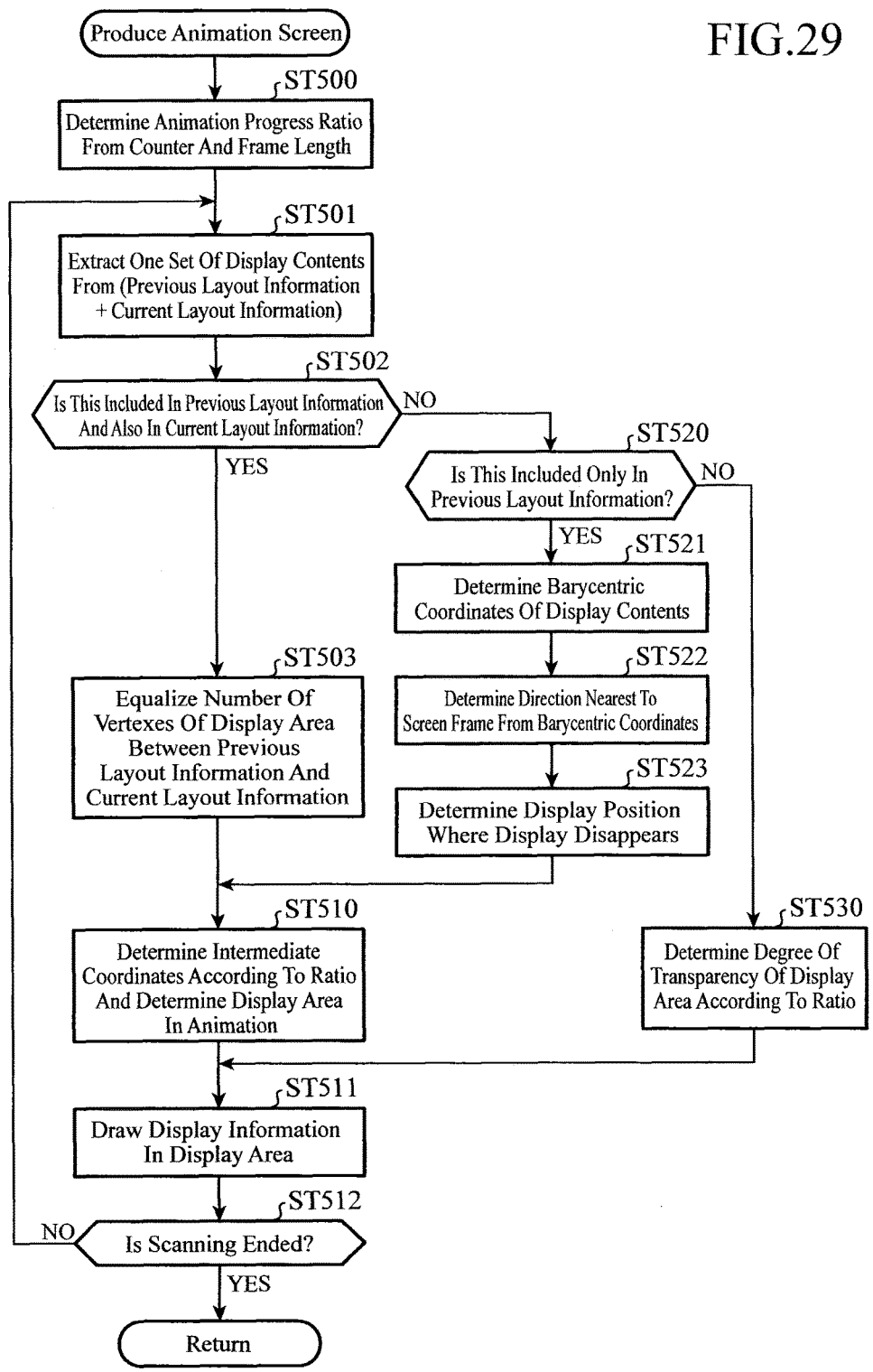
FIG. 29 is a flow chart showing an animation screen producing process in accordance with Embodiment 8.

When the display area 41 of display information 33 included in the previous layout information 53 has a shape different from that of the display information included in the current layout information 54, for example, when the shape 43 of the display area 41 of certain display information 33 included in the previous layout information 53 is a rectangle, and the shape 43 of the display area 41 of the same display information 33 included in the current layout information 54 is a hexagon, a display area determinator 2 carries out the pre-process of equalizing the number of vertexes before and after a layout change. Concretely, the animation screen producing process shown in FIG. 11 is replaced by an animation screen producing process shown in a flow chart of FIG. 29.

First, when extracted display information 33 is included in the previous layout information 53 and in the current layout information 54 (when YES in step ST502), the number of vertexes is equalized before and after a layout change in such a way that the shape having the smaller number of vertexes is transformed to a shape having the larger number of vertexes (step ST503). For example, when the shape of the certain display information 33 is transformed from the rectangle 201 to the hexagon 202, as shown in FIG. 30, the information display device causes the user to recognize that the shape 201 of the display information 33 in the previous layout information 53 has six vertexes too by causing the user to recognize that each of second and fourth vertexes of the rectangle 201 is an overlapping vertex. The information display device then determines intermediate coordinates of each of the six vertexes to determine an intermediate shape 203 (step ST510). The information display device uses the shape 203 determined this way as the shape 43 of the display area 41. FIG. 30 shows the shape 203 which is determined by assuming that the ratio of layout change is 50%.

As mentioned above, the information display device in accordance with this Embodiment 8 can produce an animation display whose shape also varies gradually even if display information to be displayed varies not only in its display position and its display area, but also in the shape of its display area. Therefore, the information display device makes it easy for the user to realize the continuity of the animation.

Although the information display device 10 is explained as a vehicle-mounted information display device in this Embodiment, the information display device in accordance with the present invention can be applied not only to a display device disposed in a car, but also to various display devices, e.g., a monitor disposed in a location where a surgical operation is performed and a process display disposed in a factory as long as the devices lay out and display various pieces of information on their screens. Particularly in the case of a device in which the layout can change while the user is not viewing the screen, by applying the display control of the information display device in accordance with the present invention, a change from the state in which an original display is produced is displayed at a time when the user is gazing at the screen. Therefore, there is provided a remarkable advantage of enabling the user to easily recognize a transition of the display of information before and after the layout is changed. Further, while few conventional display devices make an automatic layout change in the system because losing track of display information can cause a serious problem, the information display device in accordance with the present invention can prevent the user from losing track of display information, and it is therefore considered that the range of the system design can be widened and the present invention can contribute to the development of industry greatly.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

Further, in the present invention, the term "gaze" includes not only an action to concentrate on looking steadily at, but also an action to look vacantly at and then recognize an object and an action to glance by moving a line of sight in a moment.

INDUSTRIAL APPLICABILITY

The information display device in accordance with the present invention can be applied to various display devices including a vehicle-mounted information display device disposed in a car, a monitor disposed in a location where a surgical operation is performed, and a process display disposed in a factory as long as the devices lay out and display various pieces of information on their screens.

EXPLANATIONS OF REFERENCE NUMERALS 1 display area change detector, 2 display area determinator, 3 display area determination judger, 4 display information display, 5 additional information display, 10 information display device, 11 display controller, 12 gaze judger, 13 information generator, 14 display, 15 storage, 16 line of sight acquisition camera, 17 sensor group, 18 CAN information receiving device, 19 camera, 20 DSRC receiver, 21 car navigation system, 30 driving state (state of equipment), 31, 70, and 80 display layout information, 32 association table showing an association between a driving state (state of equipment) and display layout information, 33 display information, 40 display contents, 41 display area, 42 display position, 43 shape of display area, 44 rectangle information about display area, 45 table defining priorities for display contents, 46 priority, 47 permitted display contents table, 48 animation priority information, 49 number of simultaneous animations, 50 variable parameter, 51 gaze flag, 52 gaze accumulated time, 53 previous layout information, 54 current layout information, 55 animation counter, 56 animation frame length, 57 animation progress ratio, 58 animation display time, 60 display parameter, 61 frame color, 62 frame line type, 63 fill color, 64 filling shading pattern (filling pattern), 65 shape of display parameter, 66 animation priority table, 67 animation priority, 71, 81, and J2 audio information, 72 and J1 destination weather information, 73, 83, and J3 route guidance, 74, 84, and J5 tachometer, 75, 85, and J4 speed meter, 76, 86, and J6 fuel gauge, 77, 87, and J7 clock, 78, 88, and J8 vehicle information, 82 and J9 congestion-on-route information, 91 and 94 display contents of display information "audio information", 92 and 95 display area of display information "audio information", 93 and 96 display position of display information "audio information", 100 gaze time-to-spare table, 101 driving state (state of equipment), 102 gaze enable time period, 201 rectangular shape of display information in previous layout information, 202 hexagonal shape of display information in current layout information, 203 hexagonal shape which is a midpoint.

The invention claimed is:

1. An information display device that displays information on a screen according to display layout information that corresponds to a state of equipment, the display layout information including at least one piece of display information indicating a display area of the information displayed on the screen, said information display device comprising:

a gaze judger that judges whether or not a user is gazing at said screen;

a processor programmed to perform as a display area change detector that detects a change of the display area included in said display information when the display layout information changes as a result of a change in the state of the equipment;

the processor further programmed to perform as a display area determinator that, when said display area change detector detects a change of the display area when said gaze judger judges that the user is gazing at the screen, determines an updated display area of said display information according to a ratio of the change of said display area detected by the display area change detector; and a display information display that displays said display information according to either the display area of said display information included in said display layout information or the updated display area of said display information determined by said display area determinator, wherein the display area of said display information is changed every time when said display area determinator is executed during the time period judged by said display area determination judger, and, as a result, an animation display in which said display information displayed by said display information display changes continuously is produced, and said gaze accumulated time is accumulated according to a number of times that said animation display, which is ended while the user is gazing at the screen, is produced.

2. The information display device according to claim 1, wherein said information display device further includes a display area determination judger that judges a time period during which to execute said display area determinator according to a gaze accumulated time which is a cumulative total of time periods during each of which the user is gazing at said screen.

3. The information display device according to claim 2, wherein information showing a gaze enable time period for each state of said equipment is defined, said display area determination judger judges that said display area determinator is executed while said gaze accumulated time is equal to or less than a predetermined value, and said predetermined value is changed dynamically on a basis of said gaze enable time period.

4. The information display device according to claim 1, wherein said display information display includes an additional information display that displays said display information according to display layout information with which said display information is always provided, and, when a change is detected by said display area change detector, adds a display showing said change.

5. The information display device according to claim 4, wherein said additional information display displays a change of a layout of said display information by displaying an outer frame of the display area of said display information determined by said display area determinator.

6. The information display device according to claim 4, wherein said additional information display displays the change of the layout of said display information by displaying an arrow extending from an arbitrary location in the display area before the change of the layout of said display information to a corresponding arbitrary location in the display area after the change of the layout on a basis of the display area of said display information determined by said display area determinator.

7. The information display device according to claim 1, wherein when information defining a priority is also included in said display information, said display information includes a plurality of pieces of display information, and when display areas of said pieces of display information determined by said display area determinator overlap each other, said information display device displays display information having higher priority in a further front area.

8. The information display device according to claim 1, wherein information defining a permission of a continuous change display is also included in said display information, and said information display device displays a continuous change only for display information for which said continuous change display is permitted.

9. The information display device according to claim 1, wherein at least one of pieces of parameter information including a specific color, a line type, a filling pattern, and a shape is included in each piece of display information of said display information, said display information display displays said display information by using parameter information specific to said each display information.

10. The information display device according to claim 1, wherein when the display area included in the display information differs in its shape before and after the layout changes, said display area determinator carries out a pre-process of equalizing a number of vertexes of the display area of the display information before and after the layout changes, and, after that, determines the display area of said display information according to the ratio of the change of said display area.

11. An information display device that displays information on a screen according to display layout information that corresponds to a state of equipment, the display layout information including at least one piece of display information indicating a display area of the information displayed on the screen, said information display device comprising:
 a gaze judger that judges whether or not a user is gazing at said screen;
 a processor programmed to perform as a display area change detector that detects a change of the display area included in said display information when the display layout information changes as a result of a change in the state of the equipment;
 the processor further programmed to perform as a display area determinator that, when said display area change detector detects a change of the display area when said gaze judger judges that the user is gazing at the screen, determines an updated display area of said display information according to a ratio of the change of said display area detected by the display area change detector; and
 a display information display that displays said display information according to either the display area of said display information included in said display layout information or the updated display area of said display information determined by said display area determinator,
 wherein said gaze enable time period is determined through learning from the gaze accumulated time during which the user was actually gazing at the screen.

12. An information display method that displays information on a screen according to display layout information that corresponds to a state of equipment, the display layout information including at least one piece of display information indicating a display area of the information displayed on the screen, comprising:
 judging whether or not a user is gazing at said screen with a line-of-sight acquisition camera;
 detecting a change of the display area included in said display information when the display layout information changes as a result of a change in the state of the equipment;
 determining, when it is judged that the user is gazing at the screen and when the change of the display area is detected, an updated display area of said display information in accordance with a ratio of the change of said display area; and
 displaying said display information according to either the display area of said display information included in said display layout information or the updated display area of said display information determined,
 wherein the display area of said display information is changed every time when said display area determinator is executed during the time period judged by said display area determination judger, and, as a result, an animation display in which said display information displayed by said display information display changes continuously is produced, and said gaze accumulated time is accumulated according to a number of times that said animation display, which is ended while the user is gazing at the screen, is produced.

* * * * *